US009424662B2

(12) United States Patent
Curington et al.

(10) Patent No.: US 9,424,662 B2
(45) Date of Patent: Aug. 23, 2016

(54) TRIANGLE MESH COMPRESSION

(75) Inventors: Ian Curington, Berkshire (GB); Evgeny Panasyuk, Rostov on Don (RU)

(73) Assignee: VISUAL TECHNOLOGY SERVICES LIMITED, Berkshire (GB)

( * ) Notice: Subject to any disclaimer, the term of this patent is extended or adjusted under 35 U.S.C. 154(b) by 427 days.

(21) Appl. No.: 13/878,824

(22) PCT Filed: Sep. 27, 2011

(86) PCT No.: PCT/GB2011/051821
§ 371 (c)(1),
(2), (4) Date: Jun. 21, 2013

(87) PCT Pub. No.: WO2012/049471
PCT Pub. Date: Apr. 19, 2012

(65) Prior Publication Data
US 2013/0271463 A1  Oct. 17, 2013

(30) Foreign Application Priority Data

Oct. 11, 2010 (GB) .................................... 1017083.5
Jun. 27, 2011 (GB) .................................... 1110826.3

(51) Int. Cl.
G06T 17/00 (2006.01)
G06T 9/00 (2006.01)
G06T 17/05 (2011.01)

(52) U.S. Cl.
CPC .................. *G06T 9/001* (2013.01); *G06T 17/05* (2013.01)

(58) Field of Classification Search
CPC ............ G06T 9/00; G06T 9/001; G06T 17/05
See application file for complete search history.

(56) References Cited

U.S. PATENT DOCUMENTS 6,285,372 B1  9/2001  Cowsar et al.

OTHER PUBLICATIONS

Lindstrom et al., Real-Time, Continuous Level of Detail Rendering of Height Fields, Dec. 1996, ACM, p. 1-10.*
Michael Deering; "Geometry Compression"; IEEE, US, Aug. 6, 1995; pp. 13-20; XP000546211.
European Office Action for the related European Patent Application No. 11 767 038.0 dated Jul. 3, 2014.
(Continued)

*Primary Examiner* — Barry Drennan
*Assistant Examiner* — Robert Craddock
(74) *Attorney, Agent, or Firm* — Kenealy Vaidya LLP

(57) ABSTRACT

A computer implemented method of processing elevation mesh data defining a polygon mesh surface to determine an alternative representation of the surface using fewer polygons than in the original representation is disclosed. Initially original elevation mesh data is sub-sampled to generate a low resolution representation of the polygon mesh surface where vertices of polygons correspond to points on a coarser X-Y grid than the original elevation mesh data. Error values indicative of the extent that portions of the surface defined by the low resolution elevation mesh data differ from corresponding portions of the surface defined by the original elevation mesh data are then determined. An alternative representation of the polygon mesh surface is then generated which comprises: low resolution elevation mesh data for the portions of the polygon mesh surface associated with error values less than a threshold value; transition mesh data defining a polygon mesh surface immediately adjacent the perimeter of portions of the surface represented by the low resolution elevation mesh data; and higher resolution elevation mesh data for the remaining portions of the polygon mesh surface.

36 Claims, 17 Drawing Sheets

(56) References Cited

OTHER PUBLICATIONS

Australian Patent Examination Report for the related Australian Patent Application No. 2011315250 dated Oct. 14, 2014.
International Search Report and Written Opinion for PCT/GB2011/051821 mailed May 16, 2012.
Deering, "Geometry Compression", Computer Graphics Proceedings, Aug. 6-11, 1995, IEEE, pp. 13-20.
Chow, "Optimized Geometry Compression for Real-Time Rendering", Annual IEEE Conference on Visualization, Oct. 24, 1997, pp. 347-354.
Gotsman, et al., "Simplification and Compression of 3D Meshes", In: "Tutorials on Multiresolution in Geometric Modelling", Jan. 1, 2002, pp. 319-361.

* cited by examiner $V= \delta x, 0, z_{f3}$ $V= \delta x, 0, z_{f2}$ $V= \delta x, 0, z_{f1}$ $V= \delta x, -\delta y/2, z_{f0}$

TRIANGLE MESH COMPRESSION

FIELD OF THE INVENTION

The present invention relates generally to data compression and particularly to compression of elevation triangle mesh computer graphics.

BACKGROUND TO THE INVENTION

Generally, a three-dimensional triangle mesh object comprises a plurality of triangles identified by their vertices. The triangle mesh is represented by a list of triangles, in which for each triangle the co-ordinates of its three vertices are indicated. The information in the list includes the co-ordinates of the vertices, and indication of which vertices belong to each triangle. The information regarding the co-ordinates is referred to as the geometry of the object, while information pertaining to which vertices belong to each triangle is referred to as the topology or connectivity of the object.

Elevation mesh data structures are triangle meshes defined by regular uniform X-Y grid spacing and a variable Z at each grid point. Elevation mesh structures are very common in LiDAR, Sonar, GIS, Geology, Geophysics, and other application areas, where data sets can be extremely large.

A triangle mesh representation of a complex, three-dimensional object can include a large volume of data. However, the communication lines through which such data may be transferred over the Internet or other networks typically have a limited average rate of data transfer, commonly referred to as bandwidth. Therefore, it is important to compress data objects as best possible before transfer. Similar issues arise with the storage of data representing complex surfaces. The better the compression method which is used, the more data can be transferred in a given amount of time or the greater amount of data which can be stored for a given resource.

One approach to reducing the volume of data required to represent an elevation mesh is to convert a regular grid structure containing uniformly similar cell sizes, into an irregular triangular network (TIN). In such a re-grid step, gradient, curvature or other measures are used to generate a triangle mesh which fits or corresponds to the original regular grid within certain error parameters. The advantages of a TIN over a direct elevation mesh are well-known. Often 90% or more triangles may be eliminated while still preserving a good fit to the original data. After modification, large flat areas are represented by large area triangles, while in small detail features small area triangles are used.

Many techniques for transforming uniform grid data to a TIN are known. One example is the open software implementation provided by Kitware described in a technical note, "vtkGreedyTerrainDecimation C++ Class Reference Documentation", available for download from http://www.vtk.org/doc/release/5.0/html/a01452.html.

The vtkGreedyTerrainDecimation paper describes a top-down decimation approach that initially represents the height field with two triangles whose vertices are at the four corners of the original elevation mesh. In an iterative fashion, points associated with the greatest error as compared to the original height field are injected into the triangulation using a standard incremental Delaunay point insertion algorithm. Once the triangulation has been modified, the errors from the deleted triangles are deleted, and error values from the new triangles are added. In this way points are repeatedly inserted until the appropriate (user-specified) error criterion is met.

After modifying the uniform grid data into an irregular TIN, the modified data is can then be compressed using techniques such as those disclosed in "Highly Compressed Tessellation (PRC-HCT)" in ISO24517-1:2008 PDF/E SC2N570-PRC-WD.pdf (21 Jul. 2009 Edition) available for download from http://pdf.editme.com/PDFE.

The described approach distinguishes between stand-alone triangle processing and neighbor triangle processing.

For a stand-alone-triangle with vertices [V0,V1,V2], initially data for V0 is determined and stored. Data for V1 is then implicitly encoded by determining and storing a value for the vector V1−V0. Similarly data for V2 is implicitly encoded by determining and storing a value for the vector V2−(V0+V1)/2. When data for V0, V1−V0 and V2−(V0+V1)/2 has been stored a check is then made to determine if data corresponding to any of these vectors has already been stored when processing any other part of the triangle mesh. If this is the case, the explicit data for the newly stored vector is replaced with a pointer to the previously stored data.

A smaller data set for encoding triangles is achieved when processing connected triangles rather than stand-alone-triangles. This is because if two triangles share a common edge, once data for one of the triangles has been stored, data for the connected triangle only requires storing data identifying the other vertex of the connected triangle.

Thus for example assuming two neighboring triangles [V0, V1,V2] and [V0,V1,V3], connected by a common edge [V0, V1], once data encoding the vertices of the triangle [V0,V1, V2] has been determined and stored, data for the second triangle can be encoded solely by encoding data for the vertex V3.

In the PRC-HCT system data for vertex V3 is encoded as a point in a co-ordinate system relative to the centre of the common edge [V0,V1] in terms of unit vectors running along axes (V1−V0), V3−(V1+V0)/2)^(V1−V0) and (V3−(V1+V0)/2)^(V1−V0))^(V1−V0). Again once data encoding the new vertex has been determined and stored a check is made to see if corresponding data has previously been stored and if so the explicit data is replaced with a pointer to the earlier stored data.

In order to take advantage of the reduction in the size of the data set which arises through encoding triangles as neighboring triangles rather than stand alone triangles it is necessary to traverse the connected triangles in some defined fashion. In the case of the PRC-HCT method this is achieved by selecting an initial triangle and then parsing the triangle's neighbors. Neighbors of neighbors are then parsed followed by neighbors of neighbors or neighbor's etc building up a binary edge traversal tree. In this way the processing order is fully determined by the first triangle on the list and is not dependent upon any other triangle order.

Having reduced the size of a data set for a triangular mesh using the PRC-HCT approach, the processed data is then compressed using conventional data compression algorithms such as the Deflate algorithm in zLib written by Jean-Loup Gailly and Mark Adler. The Deflate algorithm is a lossless data compression algorithm which acts in two stages. Initially, data is processed to identify duplicate data streams and copies are replaced with references symbols. These symbols are then replaced with codes where the most frequent symbols are replaced using the shortest codes thereby reducing the size of the data. Further details of the zLib algorithm can be found in for example the DEFLATE Compressed Data Format Specification, L. Peter Deutsch, Aladdin Enterprises, 21 Mar. 1996, available for download from http://tools.ietf.org/html/rfc1951 which is hereby incorporated by reference.

Although data compression using terrain decimation and PRC-HCT compression reduces the size of data required to encode an elevation mesh, better compression schemes are sought in order to allow more rapid transfer and improved storage of data representing three dimensional data objects.

SUMMARY OF THE INVENTION

In accordance with one aspect of the present invention there is provided a computer implemented method of pre-processing data representing a triangle mesh having a plurality of vertices wherein the vertices correspond to points on regular uniform X-Y grid with a variable Z value at each grid point to encode the data in a manner suitable for data compression, the method comprising: selecting groups of data points at positions (x,y), (x,y+1), (x+1,y) and (x+1, y+1) corresponding to pairs of adjacent triangles in the mesh in an order which traverses the mesh; and encoding the selected groups of data by: determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises: a vector identifying the absolute position identified by a data point in the case of a first data point of a group of three data points defining a triangle in a triangle mesh; or a vector identifying the relative position identified by a data point relative to the position of previously encoded data identified by other data points in a group of data points in the case of subsequent data points in a group of three data points defining a triangle in a triangle mesh.

Encoding groups of data points corresponding pairs of adjacent triangles may comprise encoding data for a first triangle associated with positions (x,y), (x,y+1), (x+1,y) and a second triangle associated with positions (x,y+1), (x+1, y+1) and (x+1,y).

After data points corresponding to positions (x,y), (x,y+1), (x+1,y) and (x+1, y+1) have been encoded data points corresponding to positions (x,y+1), (x,y+2), (x+1, y+1), (x+1, y+1) may be encoded if z values are associated with positions (x,y+1), (x,y+2), (x+1, y+1), (x+1, y+1)

Data corresponding to positions (x+2,0), (x+2, 1), (x+3,0) and (x+3, 1) may be encoded immediately after the columns of data associated with x co-ordinates x and x+1 have been encoded.

The order in which triangles are encoded which traverses the mesh may comprise a raster pattern. Alternatively the order may comprise a spiral pattern. Other alternatives may comprise patterns which traverse successive rows or columns of the triangle mesh.

The encoding may comprise checking whether data points selected for encoding are associated with valid z value data and only encoding data for a triangle if all the data points selected for encoding a triangle are associated with valid z value data.

The encoding may also comprise determining for each data point whether data corresponding to the selected data point has previously been encoded and if so encoding data for the point by storing data identifying the selected data point as being a reference to the previous data point.

If data corresponding to a selected data point has not previously been encoded, the data point may be encoded by storing data defining a vector identifying the position identified by the x and y co-ordinates for the selected data point and the z value in the elevation mesh associated with the x and y co-ordinates. Such a stored vector may comprise: a vector identifying the absolute position identified by a data point in the case of a first data point of a group of three data points defining a triangle in a triangle mesh; a vector identifying a vector connecting the absolute position of a first data point of a to the absolute position of a second data point in the case of a second data point of a group of three data points defining a triangle in a triangle mesh; or a vector identifying a vector connecting the absolute position of the mid-point of a vector connecting the absolute position of a first data point to the absolute position of a second data point to the absolute position of a third data point in the case of a third data point of a group of three data points defining a triangle in a triangle mesh.

Encoding data points identified as being references to previous data points may comprise storing a list identifying which data points are references to previously encoded data points and a list indexing references to the previously encoded data points. The list indexing references to previously encoded data points may be processed by reducing the second and each successive entry in the list by the immediately preceding value in the list.

The generated encoding data may subsequently be processed by identifying duplicate data streams in the encoded data and replacing the duplicate data streams with codes where the most frequently duplicated data streams are replaced using the shortest codes thereby causing the encoded data to be compressed.

In accordance with another aspect of the present invention there is provided a computer implemented method of processing elevation mesh data defining a polygon mesh surface to determine an alternative representation of the surface using fewer polygons than in the original representation, the method comprising: sub-sampling original elevation mesh data defining a polygon mesh surface where vertices of polygons correspond to points on an X-Y grid with a variable Z value at each grid point to generate low resolution elevation mesh data for a low resolution representation of the polygon mesh surface where vertices of polygons correspond to points on a coarser X-Y grid than the original elevation mesh data; determining error values indicative of the extent that portions of the surface defined by the low resolution elevation mesh data differ from corresponding portions of the surface defined by the original elevation mesh data; and generating an alternative representation of the polygon mesh surface comprising: low resolution elevation mesh data for the portions of the polygon mesh surface associated with error values less than a threshold value; transition mesh data defining a polygon mesh surface immediately adjacent the perimeter of portions of the surface represented by the low resolution elevation mesh data; and higher resolution elevation mesh data for the remaining portions of the polygon mesh surface wherein the higher resolution elevation mesh data comprises data defining a polygon mesh surface where vertices of polygons correspond to points on finer regular X-Y grid than the low resolution elevation mesh data.

Sub-sampling original elevation mesh data may comprise sampling the Z values at grid points for every nth entry in every nth line in the X-Y grid.

Determining error values may comprise calculating error values based on the differences between Z values associated with grid points in the original elevation mesh data with corresponding Z values for the surface defined by portions of the surface defined by the low resolution elevation mesh data at corresponding X-Y grid points.

In some embodiments the error value for a portion of a surface comprises the maximum difference between Z values associated with grid points in the original elevation mesh data with corresponding Z values for the surface defined by portions of the surface defined by the low resolution elevation mesh data for that portion of the surface. Alternatively, the error value for a portion of a surface may comprise an average difference between Z values associated with grid points in the original elevation mesh data with corresponding Z values for the surface defined by portions of the surface defined by the low resolution elevation mesh data for that portion of the surface.

In some embodiments a plurality of error values for each portion of the surface may be determined and low resolution elevation mesh data may be utilized to represent only those portions of a surface for which all error values are less than a threshold value.

Generating higher resolution elevation mesh data may comprise: determining higher resolution elevation mesh data for the portions of the polygon mesh surface associated with error values greater than the threshold value; identifying portions of the higher resolution elevation mesh data corresponding to portions of the polygon mesh surface immediately adjacent portions of the polygon mesh surface represented by low resolution elevation mesh data; and deleting the higher resolution elevation mesh data for the identified portions of the polygon surface immediately adjacent portions of the polygon mesh surface represented by low resolution elevation mesh data.

Generating transition mesh data may then comprise identifying portions of a polygon mesh surface not represented by higher resolution or low resolution elevation mesh data; and determining a Delaunay triangulation of the identified unrepresented portions of the polygon mesh surface connecting the vertices at the perimeters the of the surfaces represented by higher and low resolution elevation mesh data.

In some embodiments the higher resolution elevation mesh data comprises original elevation mesh data for the portions of the polygon mesh surface which are not represented by the low resolution elevation mesh data or the transition mesh data.

In other embodiments, the higher resolution elevation mesh data comprises data defining a polygon mesh surface where vertices of polygons correspond to points on a plurality of finer resolution regular X-Y grids. In such embodiments the method may additionally comprise: determining high resolution elevation mesh data for the portions of a polygon mesh surface not represented by transition mesh data or low level resolution elevation data comprising data defining a polygon mesh surface where vertices of polygons correspond to points on finer regular X-Y grid than the low resolution elevation mesh data; determining error values indicative of the extent that portions of the surface defined by the high resolution elevation mesh data differ from corresponding portions of the surface defined by the original elevation mesh data; utilizing the high resolution elevation mesh data as data to represent the portions of the polygon mesh surface associated with error values less than a threshold value; generating further transition mesh data defining a polygon mesh surface immediately adjacent the perimeter of portions of the surface represented by the elevation mesh data; and generating finer resolution elevation mesh data for the remaining portions of the polygon mesh surface wherein the finer resolution elevation mesh data comprises data defining a polygon mesh surface where vertices of polygons correspond to points on finer regular X-Y grid than the high resolution elevation mesh data.

In accordance with a further aspect there may be provided a computer readable medium storing computer interpretable instructions which when interpreted by a programmable computer cause the computer to perform methods as described above.

In accordance with a further aspect of the present invention there is provided an encoding apparatus for encoding data representing a triangle mesh having a plurality of vertices wherein the vertices correspond to points on regular uniform X-Y grid with a variable Z value at each grid point, the apparatus comprising: a mesh data store operable to store elevation mesh data defining a triangle mesh having a plurality of vertices wherein the vertices correspond to points on regular uniform X-Y grid with a variable Z value at each grid point; and an encoder operable to generate data representing the content of the elevation mesh stored in the mesh data store by: selecting groups of data points at positions (x,y), (x,y+1), (x+1,y) and (x+1, y+1) corresponding to pairs of adjacent triangles in the mesh in an order which traverses the mesh; and encoding the selected groups of data by: determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises: a vector identifying the absolute position identified by a data point in the case of a first data point of a group of three data points defining a triangle in a triangle mesh; or a vector identifying the relative position identified by a data point relative to the position of previously encoded data identified by other data points in a group of data points in the case of subsequent data points in a group of three data points defining a triangle in a triangle mesh.

In accordance with another aspect of the present invention there is provided a processing apparatus for processing elevation mesh data defining a polygon mesh surface to determine an alternative representation of the surface using fewer polygons than in the original representation, the apparatus comprising: a mesh data store operable to store elevation mesh data defining a polygon mesh surface where vertices of polygons correspond to points on an X-Y grid with a variable Z value at each grid point; and a re-gridding module operable to: sub-sample elevation mesh data stored in the mesh data store to generate low resolution elevation mesh data for a low resolution representation of the polygon mesh surface where vertices of polygons correspond to points on a coarser X-Y grid than the original elevation mesh data; determine error values indicative of the extent that portions of the surface defined by the low resolution elevation mesh data differ from corresponding portions of the surface defined by the original elevation mesh data; and output as data representing an alternative representation of the polygon mesh surface: low resolution elevation mesh data for the portions of the polygon mesh surface associated with error values less than a threshold value; transition mesh data defining a polygon mesh surface immediately adjacent the perimeter of portions of the surface represented by the low resolution elevation mesh data; and higher resolution elevation mesh data for the remaining portions of the polygon mesh surface wherein the higher resolution elevation mesh data comprises data defining a polygon mesh surface where vertices of polygons correspond to points on finer regular X-Y grid than the low resolution elevation mesh data.

BRIEF DESCRIPTION OF THE DRAWINGS

Embodiments of the present invention will now be described with reference to the accompanying drawings in which.

DETAILED DESCRIPTION OF THE EMBODIMENTS

Figure 1:
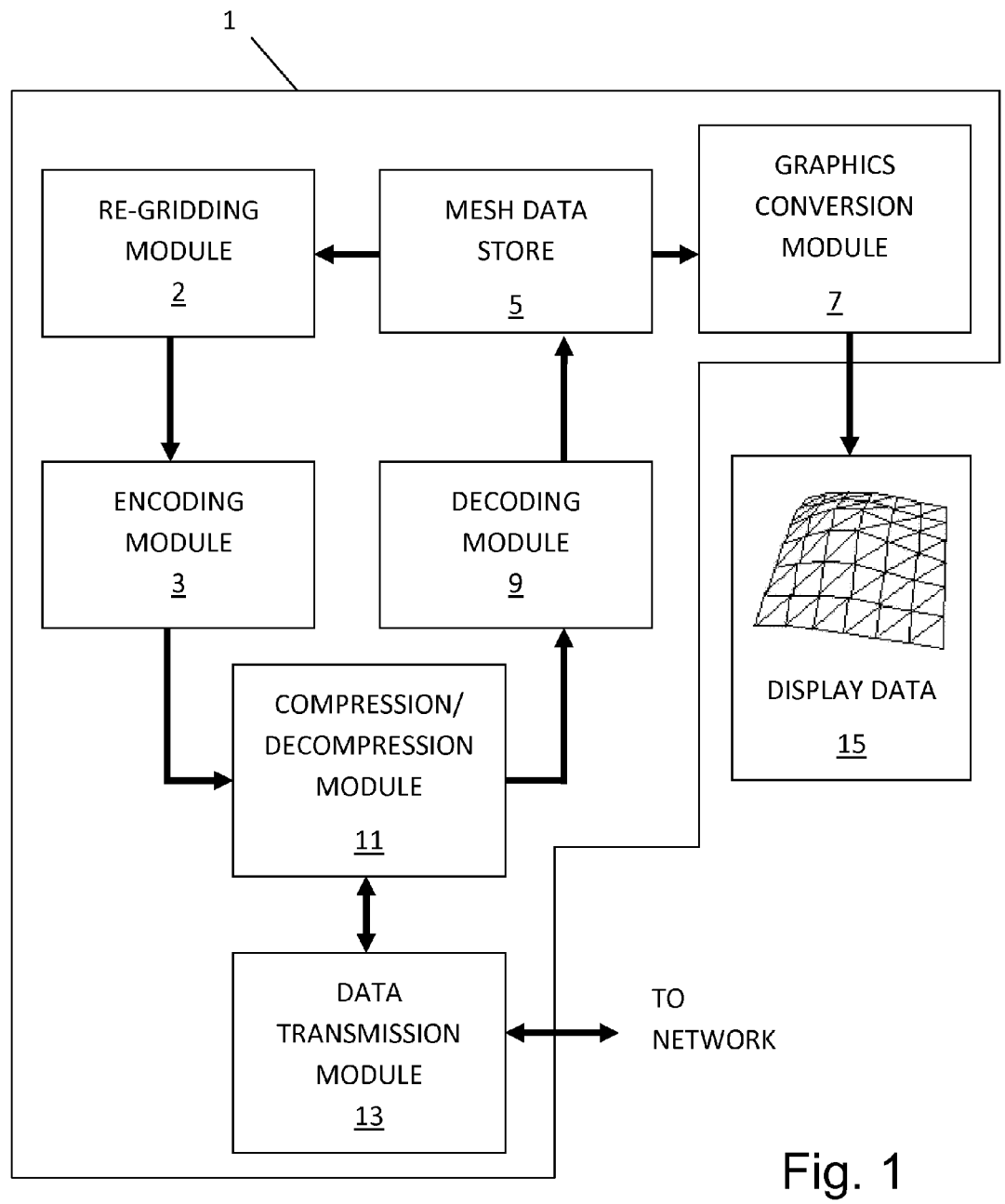
FIG. 1 is a schematic block diagram of computer system incorporating a mesh data store, a re-gridding module and an encoding module in accordance with an embodiment of the present invention.

FIG. 1 is a schematic block diagram of a computer system 1 incorporating a re-gridding module 2 and an encoding module 3 which as will be described enable highly compressed representations of an elevation mesh to be created. In addition to the re-gridding module 2 and the encoding module 3, the computer system 1 also comprises: a mesh data store 5, a graphics conversion module 7, a decoding module 9, a compression/decompression module 11 and a data transmission module 13.

The mesh data store 5 is arranged to store elevation mesh array data which defines a surface comprising an array of z (height) values where the z values identify heights at points on a regular x-y grid. Suitable elevation mesh data can be obtained in a variety of ways and is commonly obtained in the course of making scientific measurements such as using LiDAR or Sonar etc. The graphics conversion module 7 is arranged to process stored elevation mesh data and generate a display data 15 being a visual representation of the stored elevation mesh data which can be displayed on a display screen.

Detailed elevation mesh data can be of a significant size. For that reason if such data is to be transmitted to another computer via a communications network, the data needs to be compressed. Together the re-gridding and encoding modules 2,3 are arranged to process and encode stored elevation mesh data and then pass this encoded data to the compression/decompression module 11 which compresses the encoded data using the conventional zLib DEFLATE process.

As will be explained, the processing undertaken by the re-gridding 2 and encoding modules 3 is such to encode elevation mesh data into a format which is compatible with the PRC-HCT encoding standard but which when processed by the compression/decompression module 11 results in a smaller data file than is achieved using conventional encoding methods. This is achieved in a two step process. Initially, the re-gridding module 2 processes elevation mesh data to create a modified mesh which represents portions of a surface using fewer triangles than in the original representation but which largely retains the regular structure of the original elevation mesh. The encoding module 3 then processes the modified mesh where the encoding undertaken by the encoding module 3 is such to encode the regular portions of the modified mesh in a manner which results in many duplicate sections of code. Subsequently when the encoded data is compressed using a conventional zLib DEFLATE process, these duplicate sections of code are replaced with symbols where the most frequent symbols are encoded by the shortest codes. Once encoded and compressed the compressed data is then passed to the data transmission module 13 and transmitted to another computer via a network.

When data is received by the data transmission module 13 from the network it is passed to the compression/decompression module 11 which decompresses the received data to generate PRC-HCT compatible data. This PRC-HCT compatible data is then passed to the decoding module 9 which converts the PRC-HCT compatible data into elevation mesh data 5 which can then be stored in the mesh data store 5 before being used by the graphics conversion module 7 to generate display data 15 for viewing.

Figure 2:
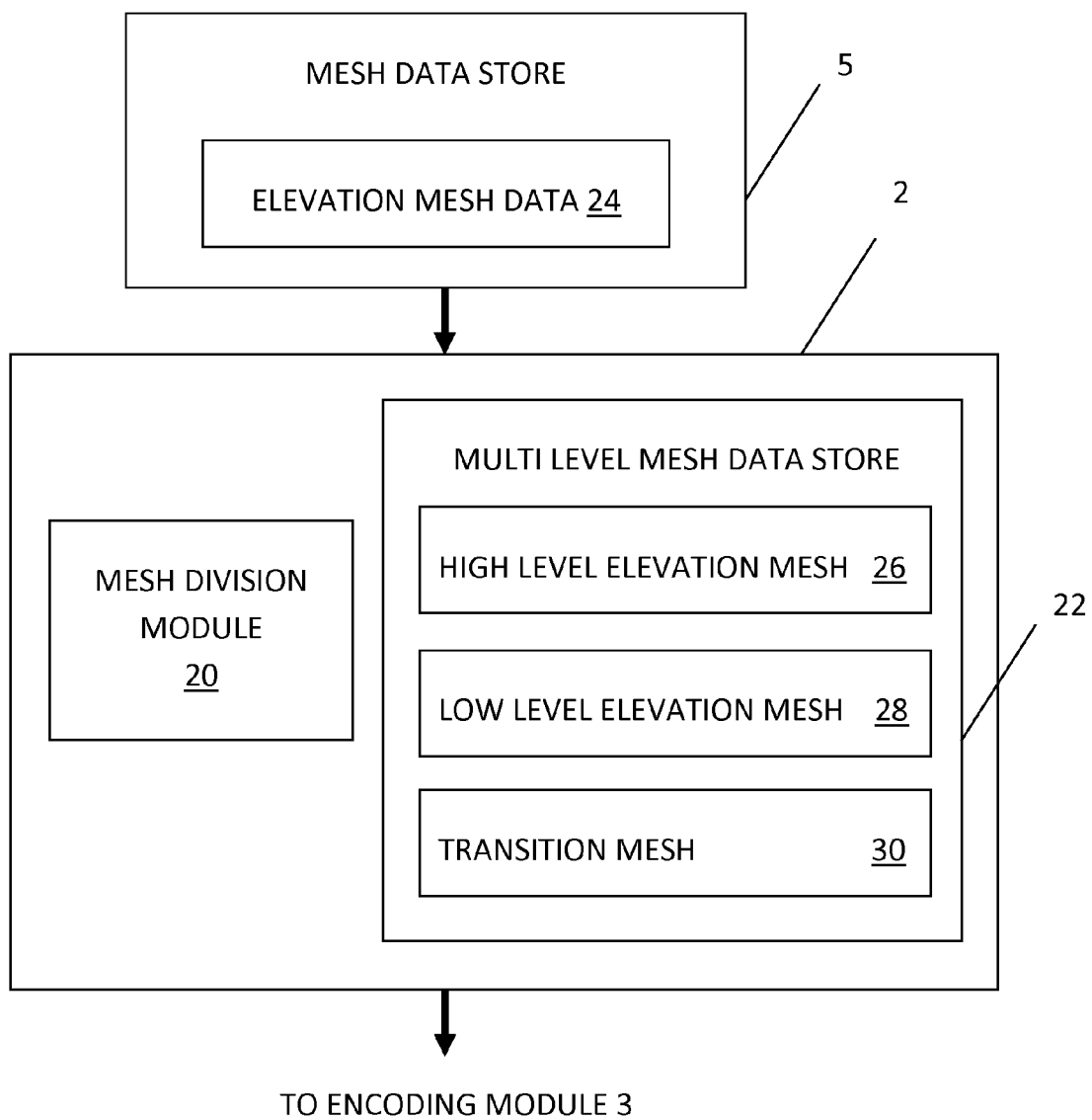
FIG. 2 is a schematic block diagram of the mesh data store and re-gridding module of FIG. 1.

The structure of the re-gridding module 2 will now be described with reference to FIG. 2.

In this embodiment the re-gridding module 2 comprises a mesh division module 20 and a multi-level mesh data store 22. The mesh division module 20 is arranged to retrieve elevation mesh data 24 from the mesh data store 5 data in the form of a two dimensional array of z (height) values and process the elevation mesh data 24 to generate a high level elevation mesh 26, a low level elevation mesh 28 and a transition mesh 30 which are stored in the multi-level mesh data store 22.

As will be explained, the processing undertaken by the mesh division module 20 is such to identify portions of the surface defined by the elevation mesh data 24 which are substantially flat and portions of the surface defined by the elevation mesh data 24 which have more significant variation in curvature. To retain the detail of the more curved areas of the surface, a high level elevation mesh 26 for representing those areas of the surface is generated and stored. For the flatter areas of the surface, such areas are represented by low level elevation mesh data 28 where the surface is represented by a lower resolution elevation mesh without introducing significant errors. Finally data for transition zones between the areas represented by the high level elevation mesh 26 and the low level elevation mesh 28 are represented by transition mesh data 30. By processing the original mesh data 24 in this way and in particular by representing the flatter areas of a surface using a lower resolution elevation mesh, the total numbers of triangles required to represent a surface is reduced.

The processing of the mesh division module 20 will now be described in greater detail with reference to FIGS. 3 and 4.

Figure 3:
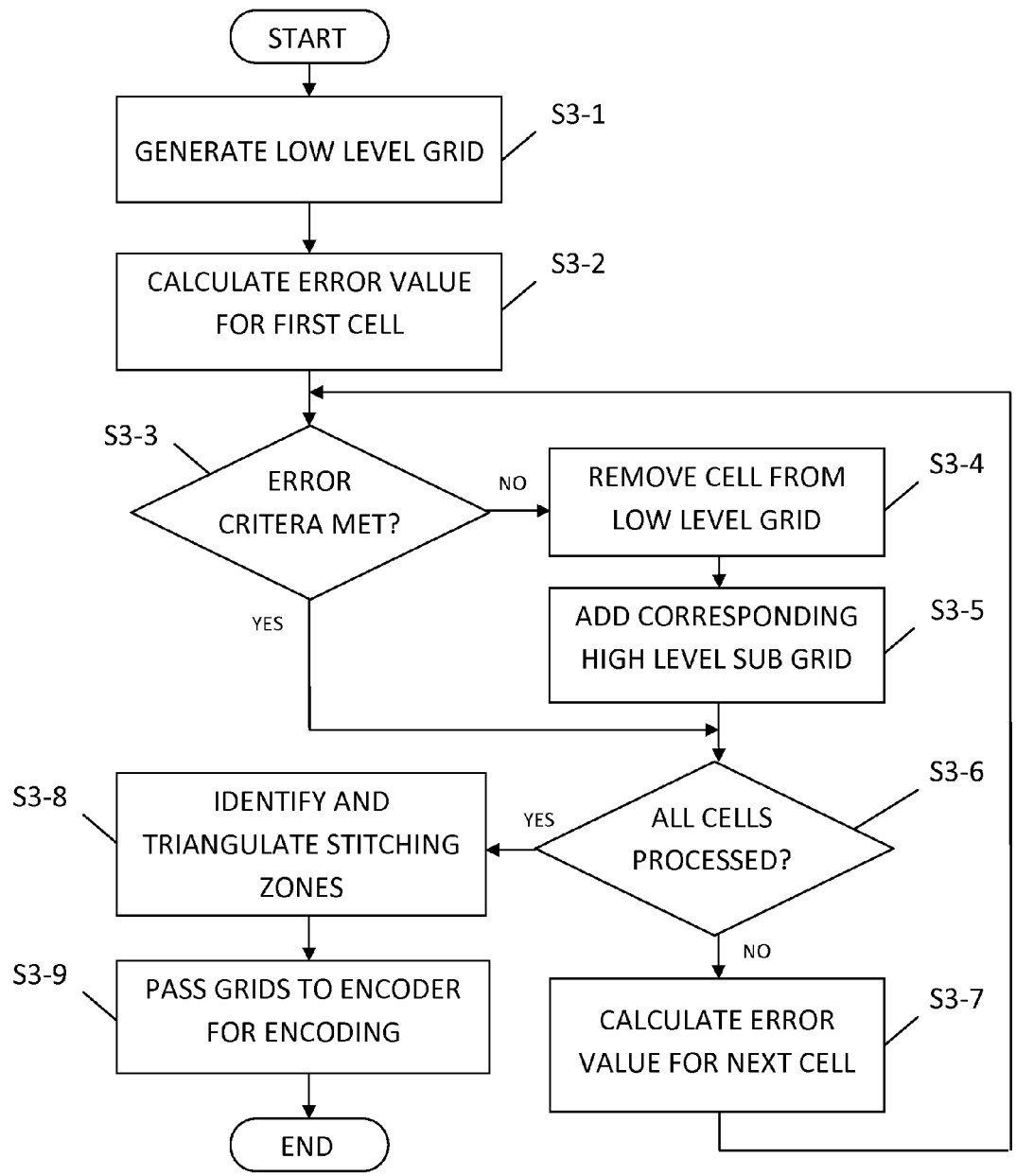
FIG. 3 is a flow diagram of the processing undertaken to generate a representation of an elevation array where different portions of the array are represented by data for different grid resolutions.

Turning to FIG. 3 which is a flow diagram of the processing undertaken by the mesh division module 20, initially (s3-1) the mesh division module 20 generates a low level elevation mesh by sub sampling the elevation mesh data 24 in the mesh data store 5 and then stores this sub-sampled representation as low level elevation mesh data 28 in the multi-level mesh data store 22.

In an elevation mesh, elevation data is stored in the form of a two dimensional array where each point in a regular x,y grid is associated with a z (height) value. A wire mesh model of a surface defined by the elevation mesh can be created by utilizing the z values and implicit x, y co-ordinates based upon the location of the z values within the array.

Figure 4A:
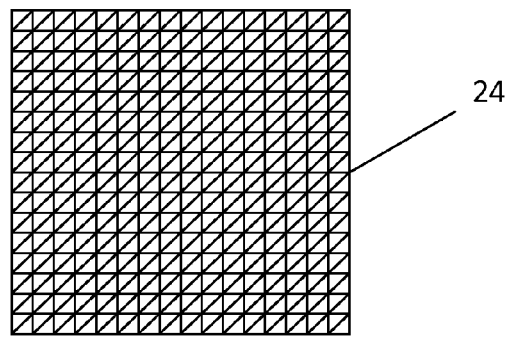
FIG. 4A is a plan view of an elevation mesh.

FIG. 4A is a plan view of a representation of wire mesh surface 24 for an exemplary elevation mesh. In FIG. 4A as an elevation mesh associates height data with points on a regular array, in plan view the surface appears as a grid of triangles corresponding to a regular grid of x y positions as the variation surface height is solely encoded in by the height data.

Figure 4B:
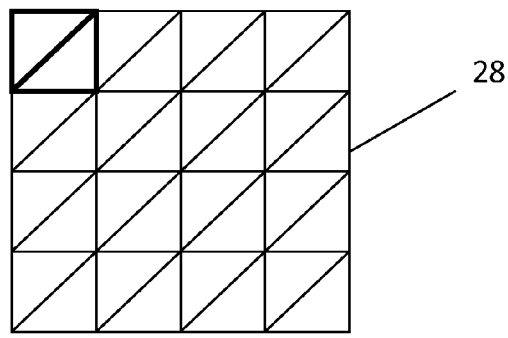
FIG. 4B is a plan view of a representation of the elevation mesh of FIG. 4A at a lower resolution.

FIG. 4B is a plan view of a representation 28 of the elevation mesh 24 of FIG. 4A at a lower resolution. In the example of FIG. 4B, the elevation mesh data 24 for the mesh of FIG. 4A is shown as having been sub-sampled with the fourth point in every four lines being retained. Thus in this way the amount of data defining the mesh is reduced 16 fold. At the same time the implicit x,y co-ordinates for the mesh are associated with points in a regular grid separated by distances of 4δx and 4δy compared with distances δx and by in the original mesh of FIG. 4A. In other embodiments the degree of sub-sampling can be greater or less than that illustrated in FIGS. 4A and 4B.

Returning to FIG. 3 having generated a low level representation 28 of the original elevation mesh 24, the mesh division module 20 then (s3-2) proceeds to calculate an error value for a first cell in the low level elevation mesh 28. That is to say that the mesh division module 20 selects an initial pair of adjacent triangles in the low level mesh 28. In FIG. 4B a suitable pair of triangles at the top left hand corner of the mesh is shown in bold. The mesh division module 20 then proceeds to determine an error value representing the extent to which the surface defined by the selected pair of triangles differs from the corresponding surface in the original elevation mesh 24 which in the case of the illustration of FIG. 4 would be the surface defined by the 4 by 4 square of entries at the top left hand corner of FIG. 4A. This can be achieved by determining for each of the vertices in the corresponding section of the original mesh 24, the distance between the height associated with the vertex in the original elevation mesh data and the height value of the corresponding position of the surface defined by the low level mesh 28. An error value for the complete cell can then be determined by calculating the sum of these distance measures.

Having calculated an error value for the cell being considered, the mesh division module 20 then (s3-3) determines whether the low level mesh 28 representation of the portion of the mesh under consideration is acceptable. That is to say the mesh division module 20 determines whether the error value exceeds a threshold which would indicate that the portion of the surface defined by the portion of the low level mesh 28 being considered differs from the surface defined by the high level mesh 26 by more than an acceptable amount.

If the error exceeds the threshold, the mesh division module 20 proceeds to modify (s3-4) the low level mesh data 28 for the cell under consideration to indicate that there is no data associated with the cell. The mesh division module 20 then updates (s3-5) the high level elevation mesh data 26 by copying the original elevation mesh data 24 for the portion of the elevation mesh being considered from the mesh data store 24 and storing that data as a corresponding portion of high level elevation mesh 26.

Thus for example assuming that the highlighted cell the low level elevation mesh 28 of FIG. 4B were to be identified as being associated with an error greater than a threshold value, this would then cause the low level elevation mesh 28 to become modified to exclude a representation of the cell. Such a modified mesh is represented as the low level mesh on the left hand side of FIG. 4C. High level mesh data for the deleted portion of the low level mesh 28 would then be added to the high level elevation mesh 26. Thus having deleted data for the cell from the low level mesh 28, the high level mesh 26 would be updated to become as illustrated on the right hand side of FIG. 4C.

Returning to FIG. 3, having updated the high level mesh 26 to include data for representing the portion of the low level mesh 28 being processed, the mesh division module 20 then (s3-6) checks whether error values for all cells in the low level mesh 28 have been determined. If this is not the case the next cell in the low level mesh 28 is then (s3-7) selected and an error value for that cell is calculated before being compared (s3-3) with a threshold and the low 28 and high 26 level mesh data being updated (s3-4-s3-5) if the error value exceeds a threshold.

Eventually the final cell in the low level elevation mesh 28 will be reached and processed.

Figure 4C:
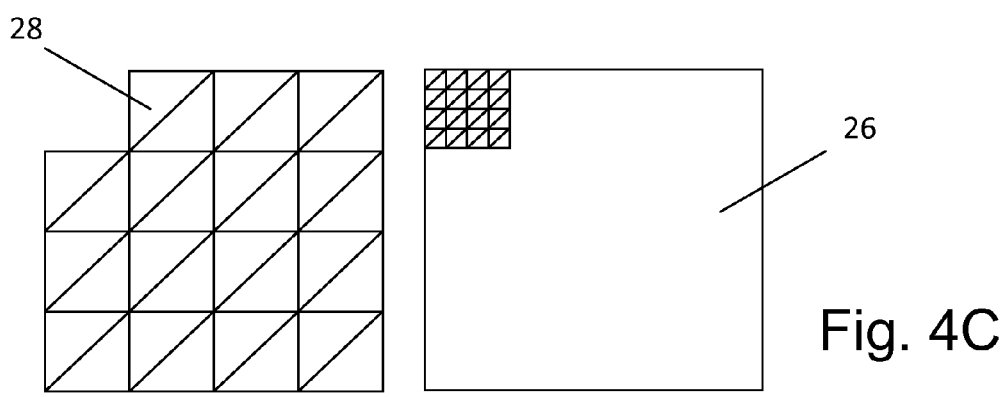
FIG. 4C is a plan view of the a high resolution and a low resolution mesh after a cell of the low resolution mesh has been deleted and a corresponding portion of the high level mesh added to the high resolution mesh.
Figure 4D:
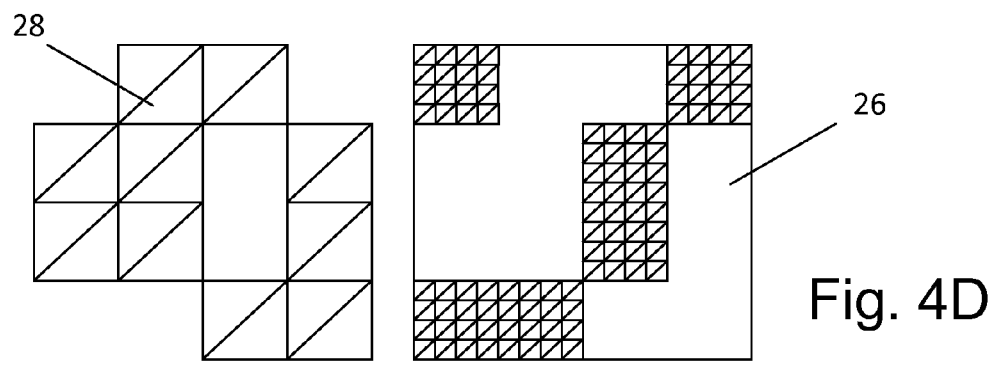
FIG. 4D is a plane view of the FIG. 4C after a number of cells in the low resolution mesh have been deleted and corresponding portions of the high level mesh added to the high resolution mesh.

FIG. 4D is a plane view of exemplary illustration of the high 26 and low 28 level meshes of FIG. 4C after all of the cells in the low level mesh 28 have been processed. As can be seen from the Figure, in the case of the illustrative example six cells in the low level mesh 28 have been removed and high level data for each of the removed cells is shown as being included in the high level mesh 26.

By processing the low level mesh 28 in the manner described all portions of the low level mesh 28 which are associated with errors greater than a threshold are removed. The combination of the low 28 and high 26 level meshes therefore comprise a representation of the surface defined by the original elevation mesh data 24 which differs from the original by no more than an acceptable amount. It will be noted that the combination of the high 26 and low 28 level mesh enable a representation of the original mesh surface to be made using far fewer triangles than in the original mesh 24.

Having determined this composite representation of the original mesh 24, the mesh division module 20 then (s3-8) proceeds to identify portions of the high level mesh 26 which are directly adjacent portions of the low level mesh 28 where any of the vertices of the high level mesh 26 are not also represented in the low level mesh 28. These portions of the high level mesh are then deleted.

Figure 5A:
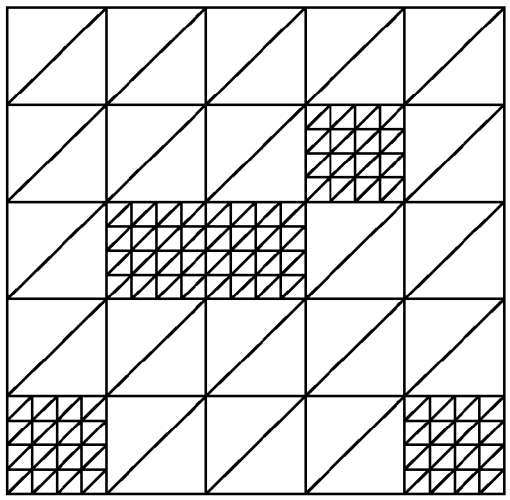
FIG. 5A is a plan view of an illustrative elevation mesh where portions of the mesh are represented by elevation mesh data of two different resolutions.
Figure 5B:
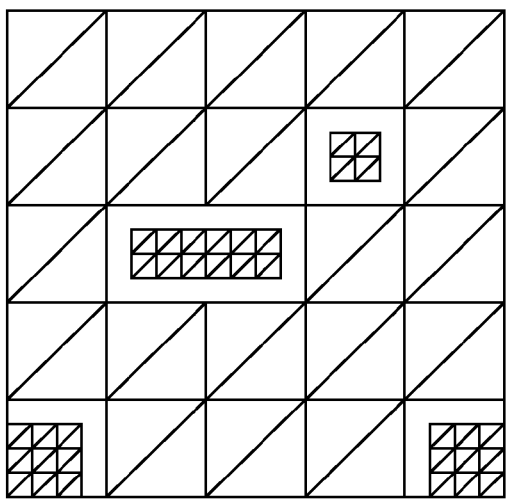
FIG. 5B is a plan view of the illustrative elevation mesh of FIG. 5A where cells at the perimeter of high resolution portions of the mesh adjacent low resolution portions of the mesh have been removed.

By way of illustration, FIG. 5A is a plan view of an illustrative elevation mesh where portions of the mesh are represented by elevation mesh data of two different resolutions and FIG. 5B is a plan view of the illustrative elevation mesh of FIG. 5A where cells at the perimeter of high resolution portions of the mesh adjacent low resolution portions of the mesh have been removed.

Having removed such cells from the high resolution mesh data 28, the mesh division module 20 then proceeds to generate transition mesh data 30 to represent the portion of the surface corresponding to the deleted cells. This is achieved by the mesh division module 20 determining a Delaunay triangulation connecting the high and low resolution portions of the mesh for the portions of the mesh corresponding to the deleted areas.

Figure 5C:
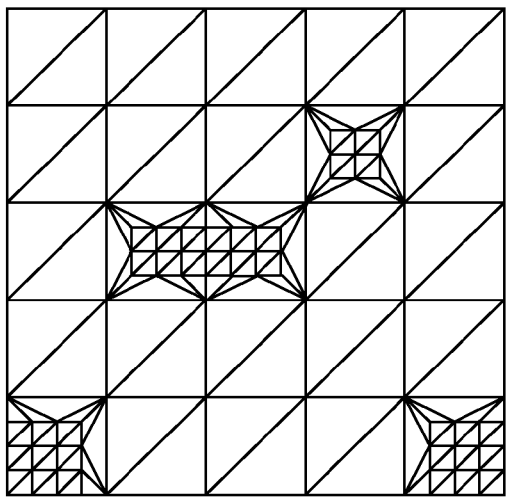
FIG. 5C is a plan view of the illustrative elevation mesh of FIG. 5B where cells at the perimeter of high resolution portions of the mesh adjacent low resolution portions of the mesh have been replace by a Delaunay triangulation connecting the high and low resolution portions of the mesh.

An illustration of the elevation mesh of FIG. 5B where cells at the perimeter of high resolution portions of the mesh adjacent low resolution portions of the mesh have been replace by a Delaunay triangulation connecting the high and low resolution portions of the mesh is shown at FIG. 5C.

Figure 6:
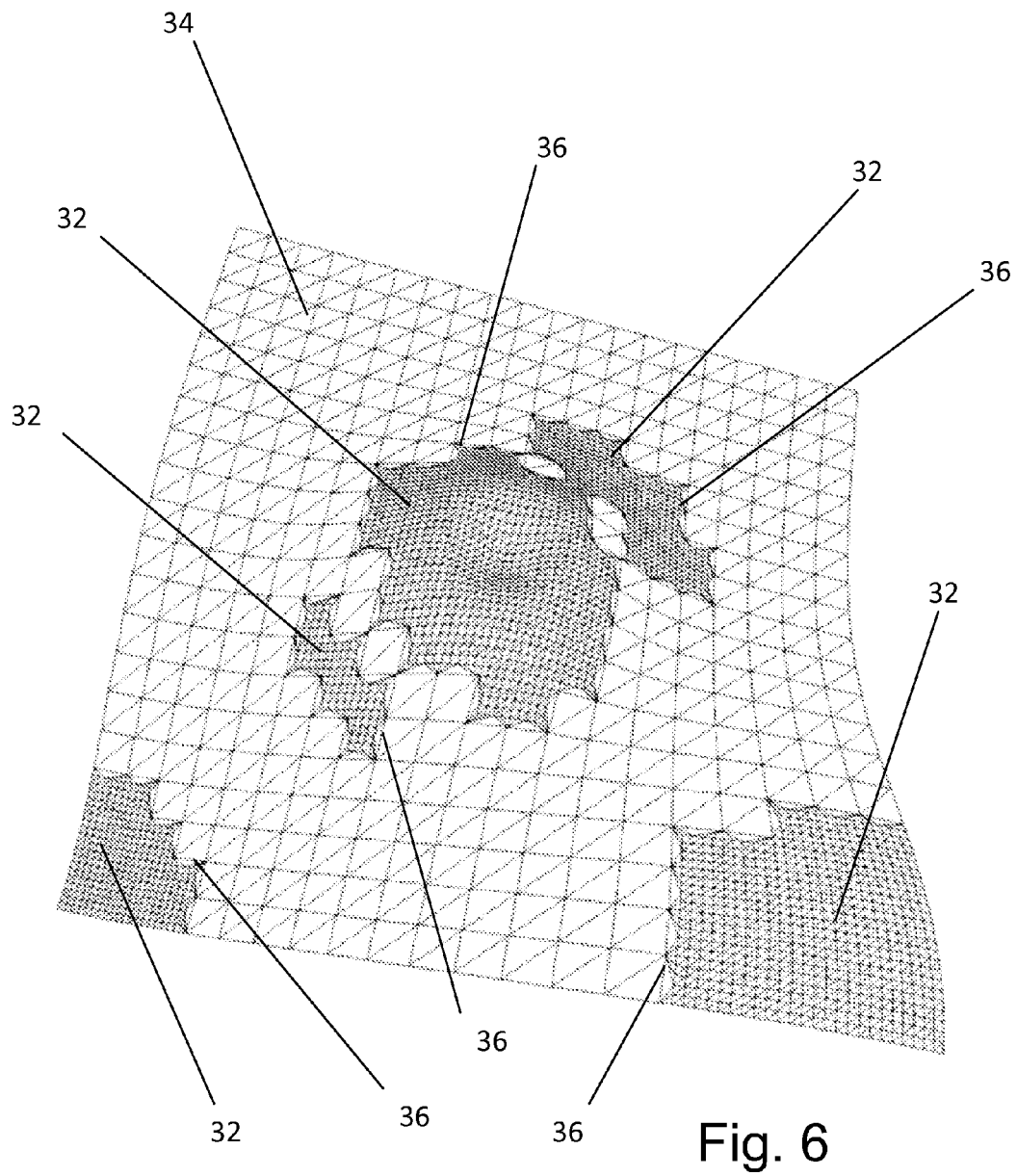
FIG. 6 is a schematic perspective view of an elevation mesh with high and low resolution portions.

A schematic perspective illustration of an elevation mesh after processing is shown in FIG. 6.

As shown in FIG. 6 after processing an elevation mesh is represented by high level elevation mesh data 26 for areas 32 requiring high levels of detail (typically area of high curvature), low level elevation mesh data 28 for areas 34 of a surface which can adequately be represented by larger triangles without introducing excessive error and transition zones 36 for connecting the high and low resolution areas. It will be noted that the portions of the surface defined by high 26 and low 28 elevation mesh data retain the regular grid pattern of the original grid but that replacing sections of the elevation grid with low level elevation mesh data 28 reduces the numbers of triangles required to represent a surface. This is the case even accounting for the introduction of additional triangles as part of the transition mesh 30 connecting portions of the surface represented by different sized triangles.

Having created the representation of the original elevation mesh surface 24, the high level 26, low level 28 and transition mesh 30 data is then (s3-9) passed to the encoding module 3 for encoding.

Figure 7:
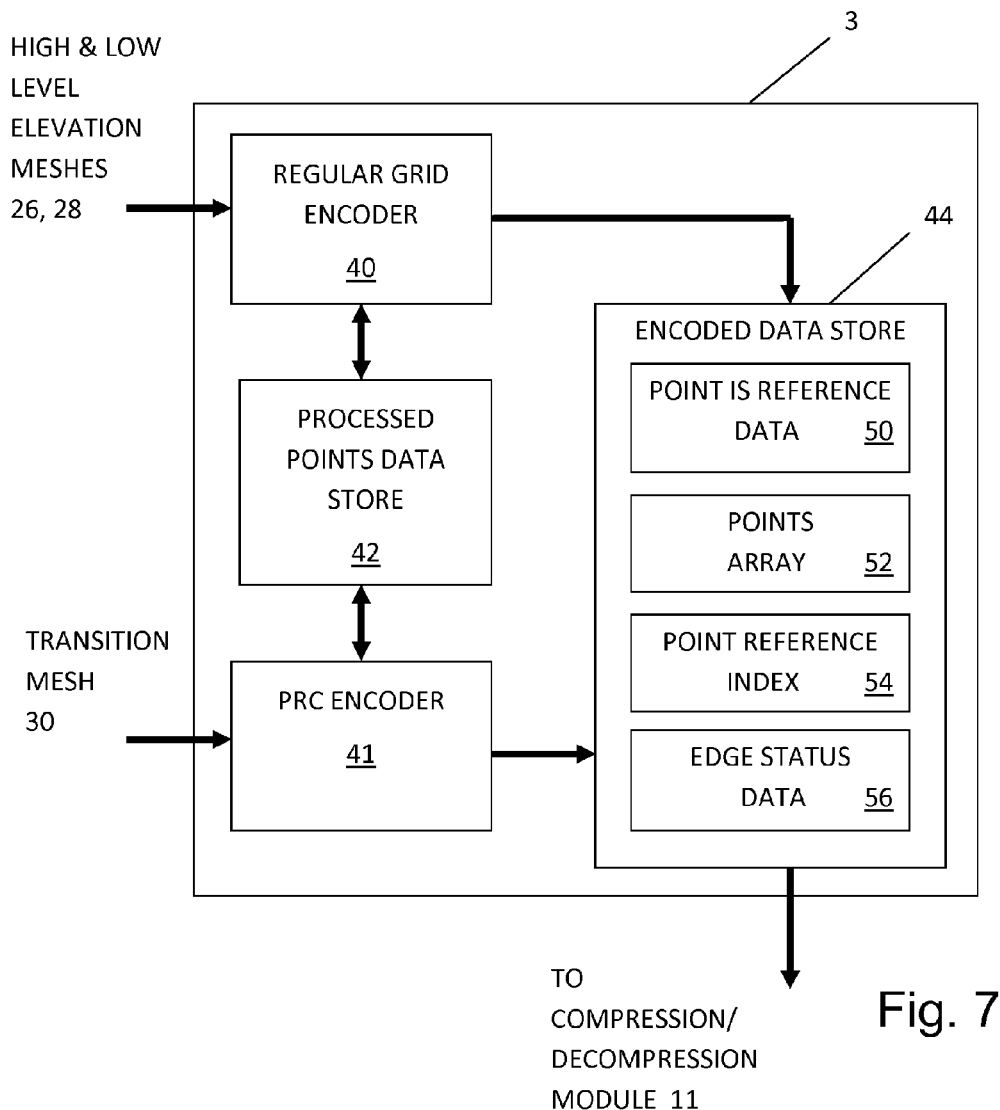
FIG. 7 is a schematic block diagram of the encoding module of FIG. 1.

FIG. 7 is a schematic block diagram of the encoding module 3.

In this embodiment, the encoding module 3 comprises a regular grid encoder 40, a PRC encoder 41, a processed data store 42 and an encoded data store 44. The regular grid encoder 40 is arranged to process the high and low level elevation meshes 26, 28 and convert the mesh data for the high and low resolution grids into encoded data which is stored in the encoded data store 44. In this embodiment, the encoded data comprises: point is reference data 50 being a list of ones and zeros indicating whether or not data for a data point has previously been stored; a points array 52 being a list of vectors encoding the absolute or relative positions corresponding to points defined by an elevation mesh; a point reference index 54 being data identifying the correspondence between points being encoded and previously encoded points; and edge status data 36 which identifies a coding status about triangles having neighbors.

The processed points data store 42 is arranged to store data defining the absolute positions of data points which have been encoded by the regular grid encoder 40. This data is used in the encoding process to identify duplicate data points.

When both the high and low level elevation meshes 26, 28 have been encoded by the regular grid encoder 40, the PRC encoder 41 processes the transition mesh 30. This PRC encoder 41 is a conventional such as is disclosed in "Highly Compressed Tessellation (PRC-HCT)" in ISO24517-1:2008 PDF/E SC2N570-PRC-WD.pdf (21 Jul. 2009 Edition) available for download from http://pdf.editme.com/PDFE which is hereby incorporated by reference. The PRC encoder 41 is arranged to encode the transition mesh 30 utilizing the processed points data in the processed points data store 42 generated by the regular grid encoder 40.

By the time the transition mesh 30 is encoded the entirety of the high and low level meshes will have been processed by the regular grid encoder 40. This will mean that data identifying the 3D locations of all of the vertices in the high and low level meshes 26, 28 will be stored in the processed points data store 42. This then enables a highly compressed representation of the transition mesh 30 to be created as the position data for the vertices in the transition mesh can be identified as corresponding to the positions of previously encoded vertices at the perimeters of the high and low level elevation meshes 26, 28.

The order of processing of elevation mesh data by the regular grid encoder 40 will now be explained with reference to FIG. 3.

Figure 8:
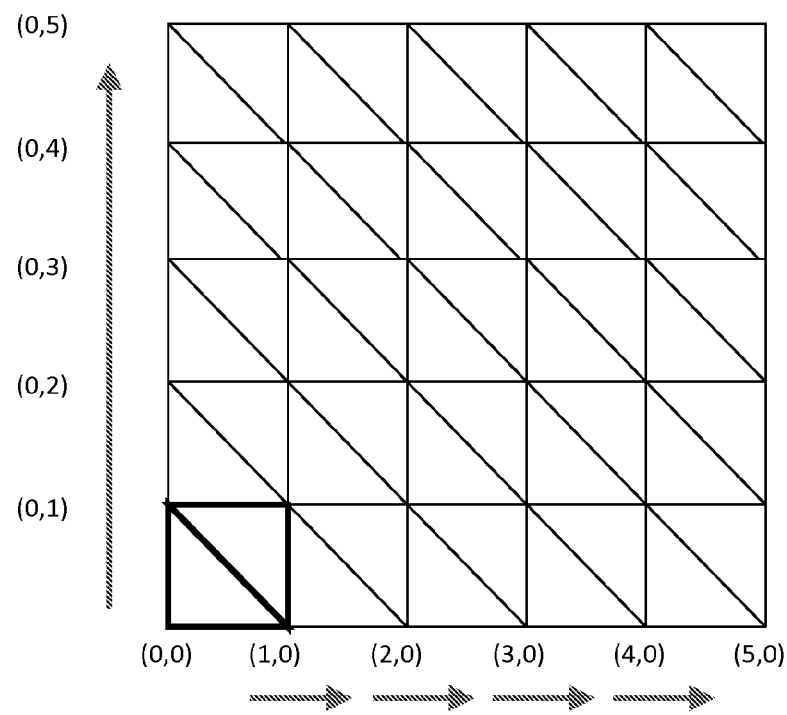
FIG. 8 is a plan view of an elevation mesh to explain the ordering of processing undertaken to process regular grid arrays.

FIG. 8 is a plan view of an elevation mesh. As has been explained previously an elevation mesh is a data structure in which points on a regular X-Y grid are associated with Z (height) values. As is shown the resultant mesh can be represented by a wire mesh model each vertex of the wire mesh model being associated with 3 dimensional co-ordinates where the x and y values are implicitly derived from a position within the grid and the z values correspond the stored height values.

In a conventional PRC-HCT encoding of a wire mesh model or triangulated piecewise polygonal surface an initial triangle is selected for encoding. Neighboring triangles are then processed followed by neighbors of neighbors etc. Whereas the conventional approach enables any wire mesh model surface to be encoded the more regular layout of an elevation mesh means that an ordering of the triangles in a mesh can be selected in advance rather than being based upon the identity of the first selected triangle and the applicants have determined that by selecting an appropriate ordering the amount of repetition in the encoded data can be increased making encoded data particularly susceptible to compression.

In this embodiment the triangles corresponding to a regular elevation mesh are processed in a raster order. That is to say that initially a first cell defined by the two triangles (shown in bold in FIG. 8) corresponding to the bottom left hand corner of the grid at the points (0,0), (0,1), (1,0) and (1,1) in the elevation mesh is processed. The regular grid encoder 40 then proceeds to encode triangles corresponding to the next cell in the first column being the cell defined by the triangles defined by the points (0,1),(0,2),(1,1),(1,2). When these have been encoded the next cell in the column are selected and processed. This is repeated until the end of the column is reached. In the example illustrated this would be the cell (0,4),(0,5), (1,4), (1,5). After this cell has been processed and encoded the next column is processed beginning with the first cell (1,0), (1,1), (2,0), (2,1) in the column. This is then followed by the next cell (1,1),(1,2), (2,1), (2,2) and so on until the entire grid is processed.

Figure 9:
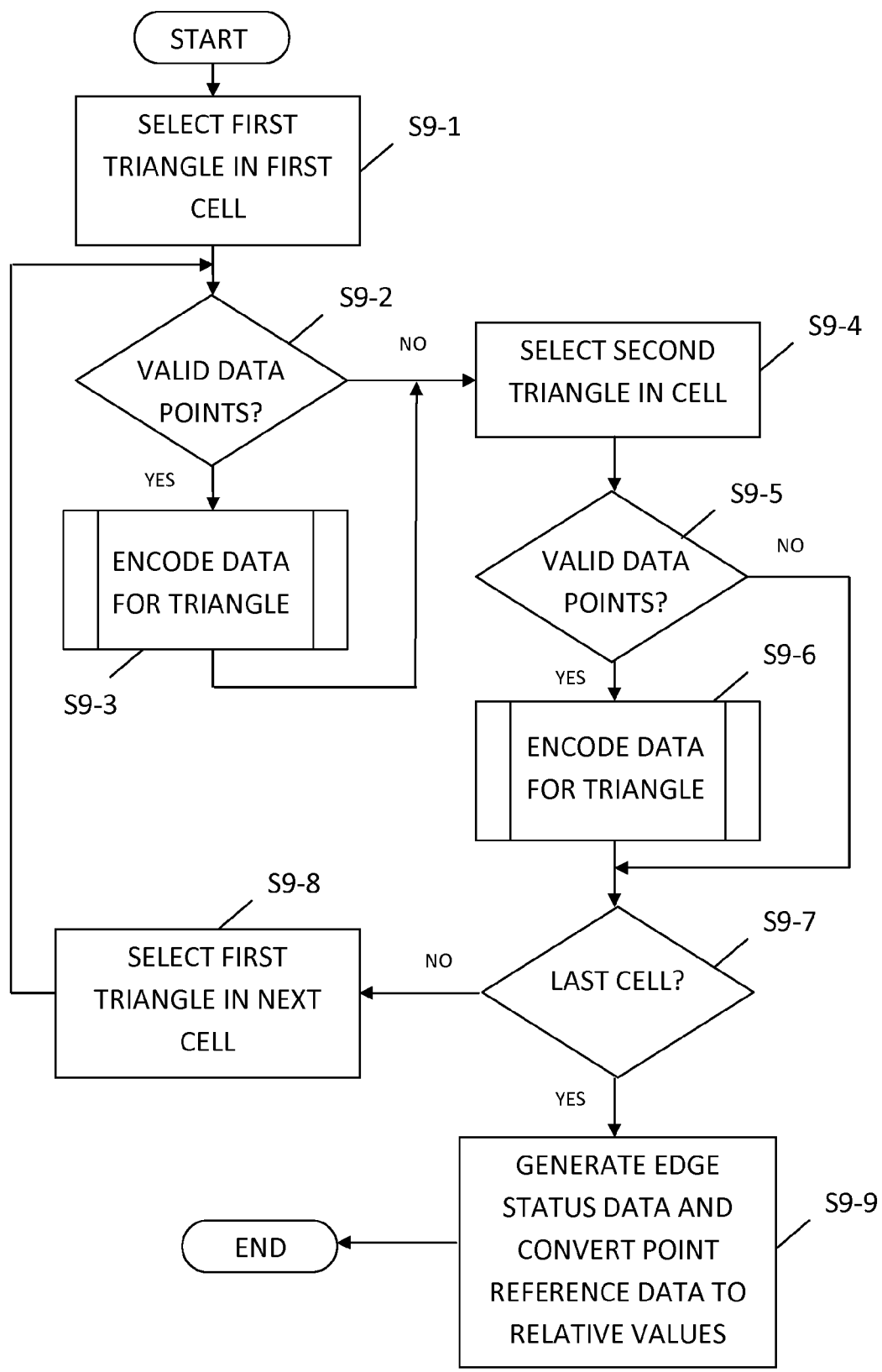
FIG. 9 is a flow diagram of the processing undertaken to encode regular grid arrays.

FIG. 9 is a flow diagram of the processing undertaken by the regular grid encoder 40.

Initially, a triangle of data points is selected (s9-1) for processing. In this embodiment, this is the z values stored a positions (0,0), (0,1) and (1,1) in the regular elevation mesh being processed.

The regular grid encoder 40 then proceeds to check (s9-2) whether valid z values are stored in each of the identified sections of the array. That is to say the encoder determines whether each of the co-ordinates associated with the triangle of points currently being processed identifies a valid z value or whether any of the co-ordinates is associated with a null value indicating that no data is stored in the array for that particular point.

If any of the set of co-ordinates is determined to correspond to a null value, that will indicate that the portion of the elevation mesh being processed does not have data associated with it and hence the currently processed portion of the elevation mesh identifies a hole in the surface defined by the mesh. If that is the case, no data is generated to encode that portion of the elevation mesh.

If, however, the regular grid encoder 40 determines that all of the points in the array currently being processed are associated with valid z values, the regular grid encoder 40 then proceeds (s9-3) to encode data for that portion of the array.

Figure 10A:
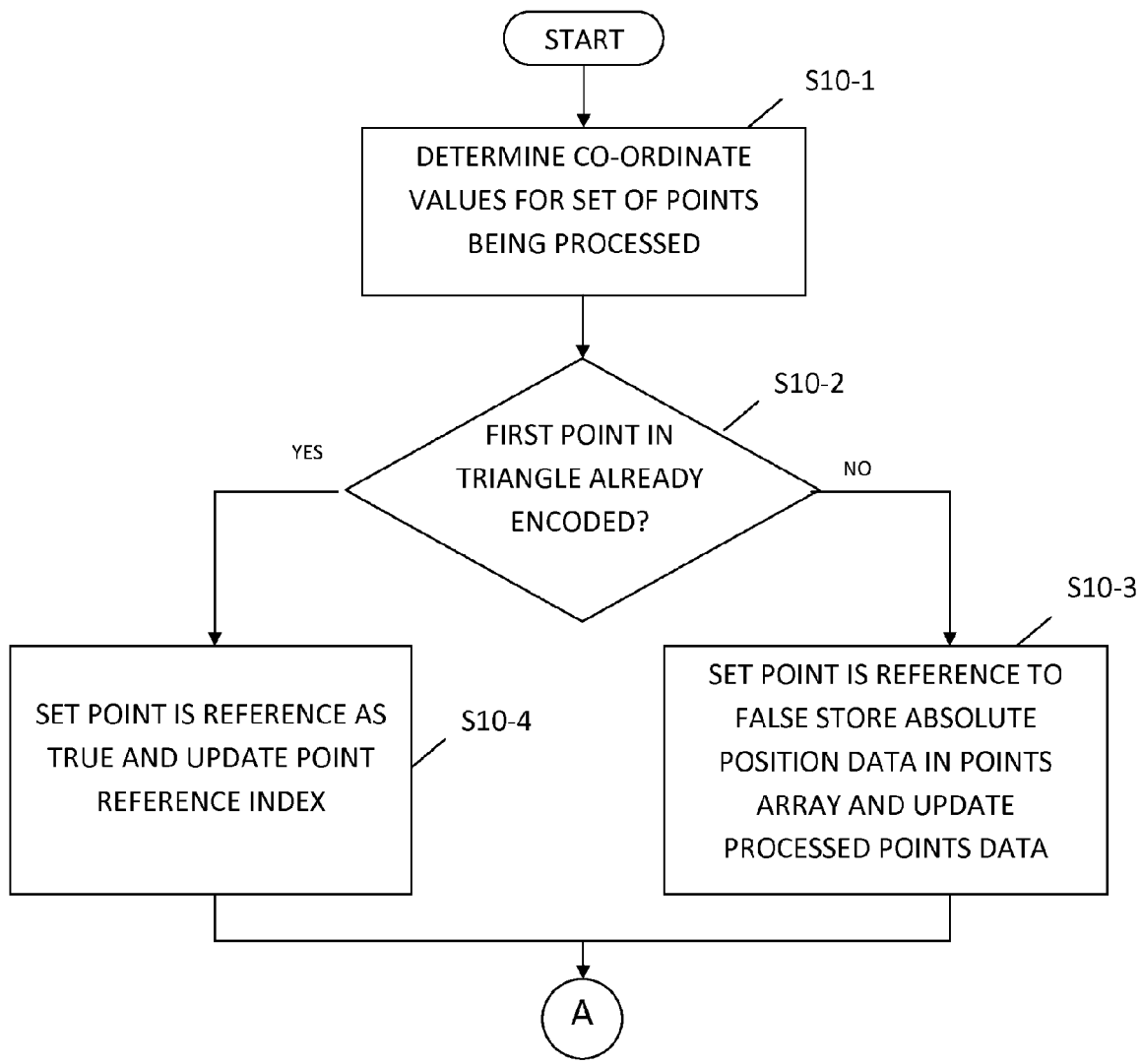
FIG. 10 is a flow diagram of the processing undertaken by the encoding module of FIG. 1 to encode data representing an individual triangle in an elevation mesh.
Figure 10B:
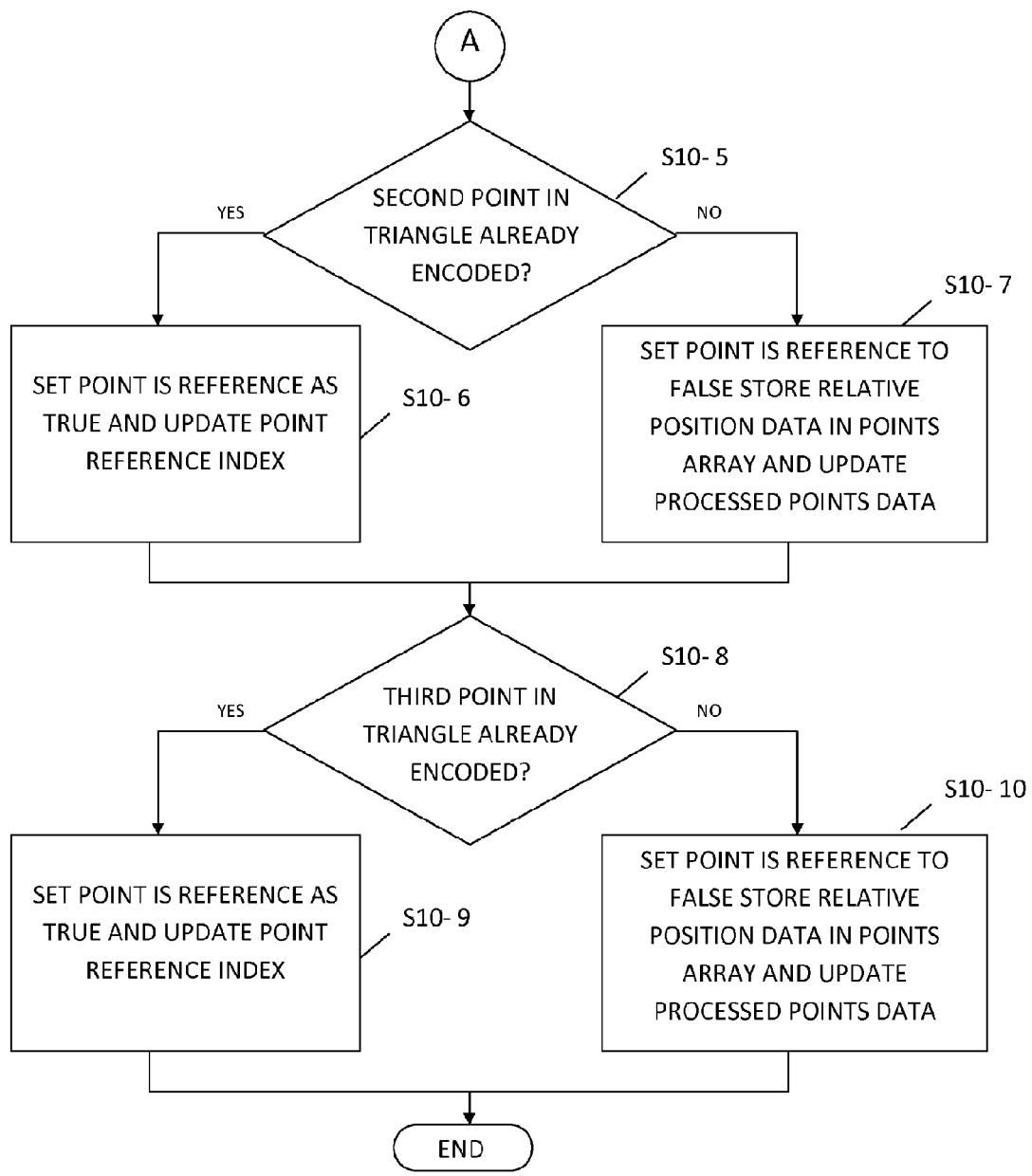

FIG. 10 is a flow diagram of the processing undertaken by the regular grid encoder 40 to encode data for a triangle corresponding to 3 points on a surface defined by an elevation mesh.

Having established that three points being encoded correspond to valid data, the regular grid encoder 40 then proceeds to generate (s10-1) co-ordinate values for the points being processed. This co-ordinate data is generated by converting the x and y values used to identify entries in the elevation mesh array being processed into absolute position data by multiplying the x and y co-ordinates by the distances between points in the x-y grid the elevation mesh represents and combining the determined x and y values with the z value stored for that x,y location in the elevation mesh array.

Thus for example when processing data for the bottom corner of the elevation mesh array corresponding to points (0,0), (0,1) and (1,0), the encoder would proceed to generate position data for 3 points P0, P1 and P2 where P0=[0*δx, 0*δy, z(0,0)], P1=[0*δx,1*δy, z(0,1)] and P2=[1*δx,0,z(1,0)] where z(x,y) is the height data stored at position x,y in the elevation mesh array being processed and δx and δy are the distances between points in the x and y grid represented by the elevation mesh array being processed in the x and y directions respectively.

Having determined position data for the three data points being processed, the regular grid encoder 40 then (s10-2) selects the first point of the set and compares the position data for that point with position data stored in the processed points data store 42.

Initially the processed points data store will be empty. So when processing the first point on a grid, the encoder will not identify any matching data within the processed points data store 42. The regular grid encoder 40 then (s10-3) proceeds to update the point is reference data 50 indicating that the current point is not a reference to an earlier point by appending a zero to the current point is reference data list 50. Data identifying the absolute position data for the point is then stored in the points array 52. Finally the processed points data in the processed points data store 42 is updated by storing a copy of the determined absolute position data for the current point together with a counter value.

Thus for example after processing position data for a point P0=[0,0,$z_0$] the following data would be stored:
Point is Reference Data
[0]
Points Array
[0,0,$z_0$]
Processed Points Data
[0,0,$z_0$]

Having stored data encoding the first of the three data points to be encoded, the regular grid encoder 40 then proceeds to check (s10-5) whether data corresponding to the absolute position data for the second of the set of three data points appears in the processed points data store 42.

If this is not the case the regular grid encoder 40 then (s10-7) proceeds to update the point is reference data 50 indicating that the current point is not a reference to an earlier point by appending a zero to the current point is reference data list 50. Data identifying relative position data for the point is then stored in the points array 52. This data comprises data for a vector connecting the first data point in the set and the point being processed. Finally the processed points data in the processed points data store 42 is updated by storing a copy of the determined absolute position data for the current point together with a counter value.

Thus for example in the case of processing data for a point P1=[0, δy, $z_1$] after processing the data for P0 above the following data will be stored:
Point is Reference Data
[0,0]
Points Array
[0,0,$z_0$, 0, δy, $z_1-z_0$]
Processed Points Data
[0,0,$z_0$]
[0, δy, $z_1$]

Having processed the second point in the data set, the third point is then processed. As with the previous points initially the processed points data store 42 is checked (s10-8) to determine whether it contains data corresponding to the absolute position values for the point being processed.

If this is not the case the regular grid encoder 40 then (s10-10) proceeds to update the point is reference data 50 indicating that the current point is not a reference to an earlier point by appending a zero to the current point is reference data list 50. Data identifying relative position data for the point is then stored in the points array 52. In contrast to the data for encoding the second data point in a set, this data comprises a vector connecting the middle of the edge of connecting the first two points in the data set to the third point. Finally the processed points data 52 in the processed points data store 42 is updated by storing a copy of the determined absolute position data for the current point together with a counter value.

Thus in the case of processing a third data point P2=[δx,0, $z_2$] after processing the points P0 and P1 as described above, the following data would be stored:
Point is Reference Data
[0,0,0]
Points Array
[0,0,$z_0$, 0, δy, $z_1-z_0$, δx, $-δy/2$, $z_2-(z_1-z_0)/2$]
Processed Points Data
[0,0,$z_0$]
[0, δy, $z_1$]
[δx, 0, $z_2$]

Figure 11:
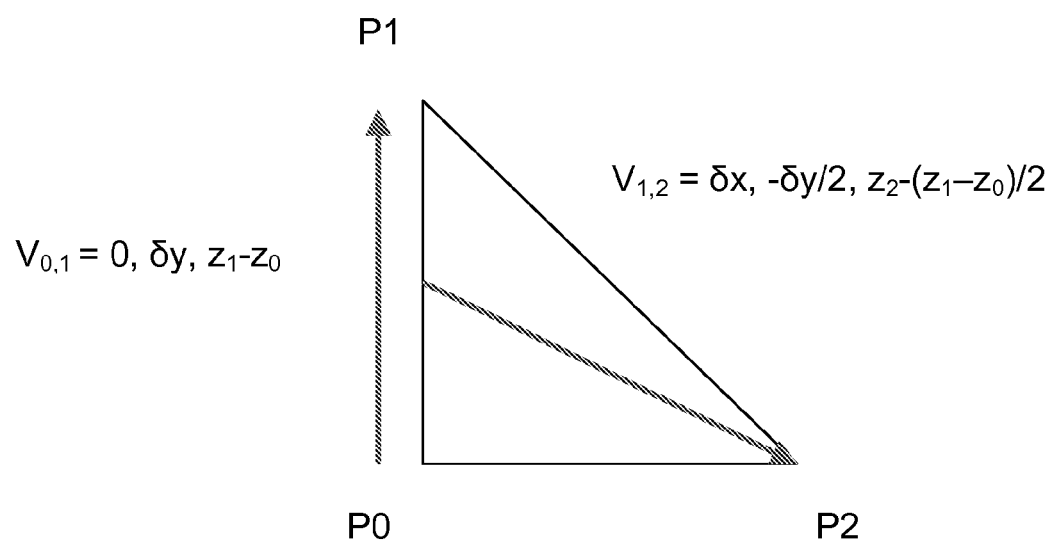
FIG. 11 is a schematic illustration for explaining the encoding of a first triangle in a cell in an elevation mesh.

FIG. 11 is a schematic illustration of the encoding of an initial triangle of three data points in an elevation mesh as indicated at this stage the points is reference data indicates none of the encoded points have previously been encoded. The points array data then comprises 3 vectors comprising a vector corresponding to the absolute position of P0, a vector $V_{0,1}$ connecting P0 and P1 and a vector $V_{1,2}$ connecting the middle of the vector $V_{0,1}$ to P2. As will be apparent considering FIG. 11 the stored data is sufficient in order to regenerate all of the position data for the processed points P0, P1, and P2.

Returning to FIG. 9 having encoded data for an initial three data points the regular grid encoder 40 then proceeds to select (s9-4) a second three data points in the cell currently being processed. That is to say, having processed data points corresponding to points (x,y), (x, y+1) and (y, x+1), the encoder proceeds to generate data encoding data points (x+1,y), (x+1, y+1) and (x+1,y).

The regular grid encoder 40 then (s9-5) proceeds to check that there is data stored in the elevation mesh array being processed at the selected co-ordinates and if this is the case, the regular grid encoder 40 then (s9-6) encodes data for the selected data points in the same way in which data for the first set of data points for a cell is encoded.

Returning to FIG. 10, after having determined (s10-1) a set of co-ordinate values for the set of points being processed the initial data point is then selected and the regular grid encoder 40 checks (s10-2) whether the first data point in the current set of three being encoded corresponds to data in the processed points data store 42.

When processing the second set of three data points in a cell (x+1,y), (x+1, y+1) and (x+1,y) the regular grid encoder 40 will identify that the first data point (x+1,y) corresponds to a point which has previously been encoded. The regular grid encoder 40 then (s5-4) proceeds to update the point is reference data 50 indicating that the current point is a reference to an earlier point by appending a one to the current point is reference data list 50. The point is reference index 54 is then updated by adding the index number for associated with the absolute position data in the processed points data store 42 matching the absolute position data for the point currently being processed to the reference index 54.

Thus in the case of processing a third data point P3=[0, δy, $z_1$], after processing the points P0, P1, P2 as described above, the regular grid encoder 40 would initially determine that the absolute position data for the point being processed matched the previously stored in relation to P1. Having identified the match a one would then be appended to the point is reference data 50, and the point reference index 52 would be updated to indicate that the first point identified as a reference corresponds to item 1 in the list of previously processed points stored in the processed points data store 52 previously processed.

Thus after processing data for point P3 the following data would be stored:
Point is Reference Data
[0,0,0,1]
Points Array
[0,0,$z_0$, 0, δy, $z_1-z_0$, δx, -δy/2, $z_2-(z_1-z_0)/2$]
Processed Points Data
[0,0,$z_0$]
[0, δy, $z_1$]
[$δ_x$, 0, $z_2$]
Point Reference Index
[1]

Having processed the first point in the set of data points currently being processed the second data point would then be considered (s10-5). If no match for the absolute position data for the set is found in the processed points data store 42 as explained previously data defining the vector connecting the first data point to the second data point in the set is determined (s10-7) and the point is reference data 50, points array 52 and the processed points data is updated in the same manner as has previously been described.

The third data point in the set is then considered. Again the absolute position data for the third data point is compared (s10-8) with the data previously stored in the processed points data store 42. In the case of the third point in a second data set for a cell in the array, there will be a match if the first data set for the cell has also been processed. If this is the case the point is reference data 50 is updated (s10-9) by adding a one to the list and the point reference index 54 is updated by appending the index value for the previously processed point corresponding to the point currently being processed.

Figure 12:
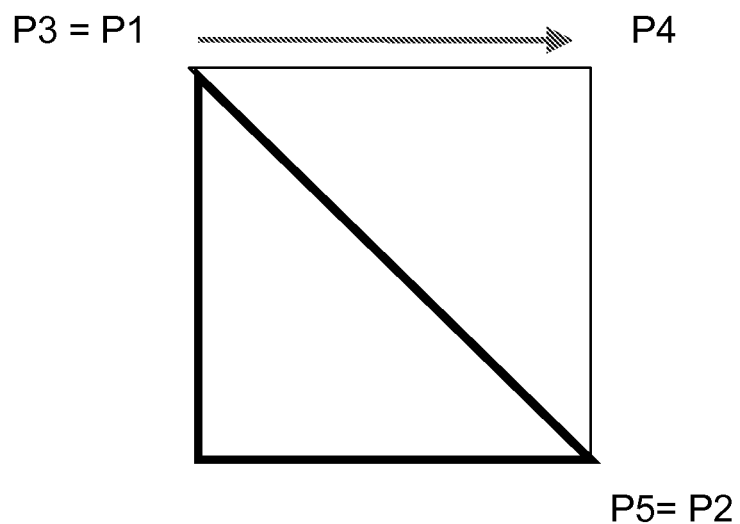
FIG. 12 is a schematic illustration for explaining the encoding of a second triangle in a cell in an elevation mesh.

FIG. 12 is a schematic illustration of the encoding of a second triangle of three data points in an elevation mesh following the encoding of the first triangle shown in FIG. 11. As is indicated when processing the data for the second set of data points matches would be found between points P1 and P3 and P5 and P2 and hence no points array data 52 would be stored in respect of those points but rather the point is reference data 50 and the point reference index 54 is updated to indicate the correspondence of between points P1 and P3 and P5 and P2. As no correspondence can be found for point P4, points array data 32 is stored for the vector $V_{3,4}$ connecting P3 and P4.

Thus having processed the second set of data points for the cell being considered, the following data would be stored:
Point is Reference Data
[0,0,0,1,0,1]
Points Array
[0,0,$z_0$, 0, δy, $z_1-z_0$, δx, -δy/2, $z_2-(z_1-z_0)/2$, δx, 0, $z_4-z_3$]
Processed Points Data
[0,0, $z_0$]
[0, δy, $z_1$]
[δx,0, $z_2$]
[δx, δx, $z_4$]
Point Reference Index
[1,2]

Returning to FIG. 9, having encoded data for the second set of three data points for a cell, the regular grid encoder 40 then determines (s9-7) whether the entire elevation mesh array being processed has now been encoded. If this is not the case, the encoder selects (s9-8) the next three data points in the array for encoding. In this embodiment, this is achieved by selecting points (x+1,y), (x+2,y) and (x+1, y+1) for processing after points (x+1,y), (x+1, y+1) and (x+1,y) have been processed or if the end of a column has been reached processing points (0,y+1), (1,y+1), (0,y+2).

By progressing through the elevation mesh array in a raster pattern through each adjacent set of three data points as will be explained in detail later regular patterns are generated within the point is reference data 50, the points array 52 and the point reference index 54. This then enables the generated data to be compressed more to a greater extent than arises with conventionally encoded data.

Having encoded data for one cell in the elevation mesh array, unless the end of a column has been reached, the three data points adjacent to the previously encoded data are considered for processing (s9-2). If these data points are associated with valid data, the data points are then encoded (s9-3).

Figure 13:
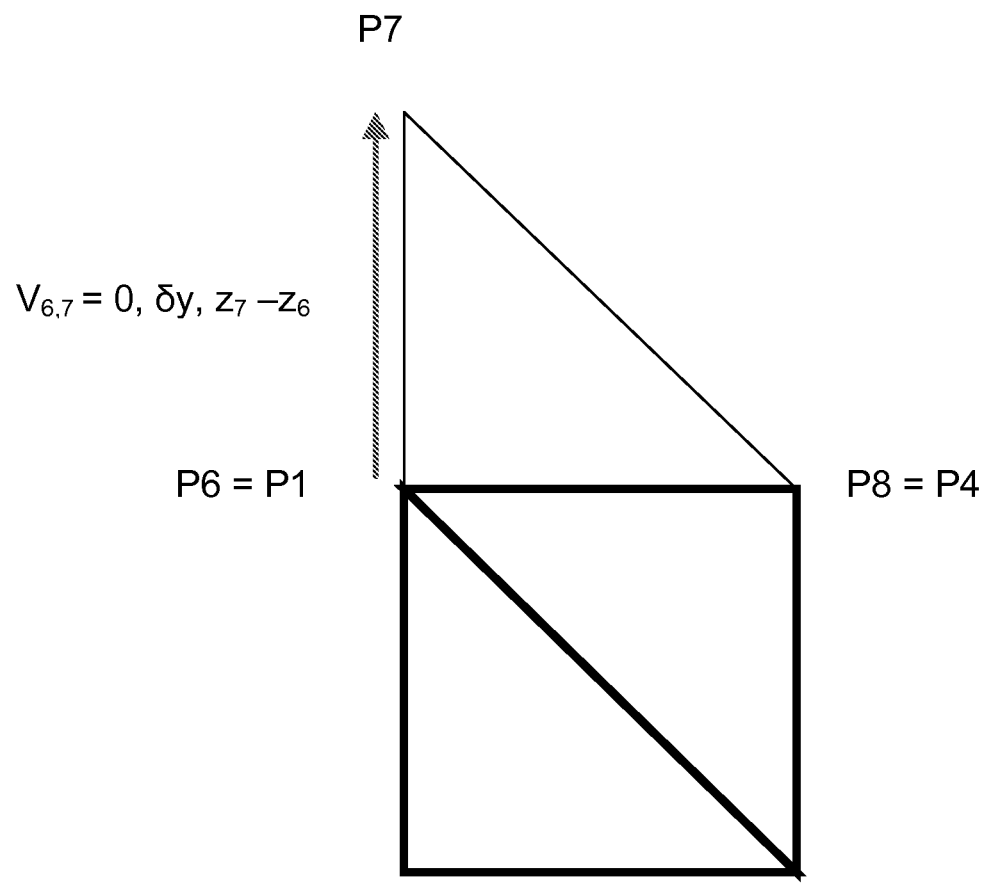
FIG. 13 is a schematic illustration for explaining the encoding of a first triangle in a cell in an elevation mesh adjacent a previously encoded cell.

FIG. 13 is a schematic illustration of the encoding of a triangle of three data points in an elevation mesh adjacent a previously encoded set of data points such as illustrated in FIG. 12. As is indicated in FIG. 13 where a set of points for an adjacent cell has already been encoded, matches will be identified between the data in the processed points data store 42 and the absolute position data for the points being processed. Thus in the case of set of three data points P6, P7, P8 adjacent a previously encoded cell a correspondence would be identified between points P6 and P1 and P8 and P4 and hence only data encoding a vector connecting P6 and P7 would be stored and hence the set of points illustrated in FIG. 13 would be encoded by updating the data stored encoding the original cell to become as follows:
Point is Reference Data
[0,0,0,1,0,1,1,0,1]
Points Array
[0,0,$z_0$, 0, δy, $z_1-z_0$, δx, -δy/2, $z_2-(z_1-z_0)/2$, δx, 0, $z_4-z_3$, 0, δy, $z_7-z_6$]
Processed Points Data
[0,0,$z_0$]
[0, δy, $z_1$]
[δx, 0, $z_2$]
[δx, δy, $z_4$]
[0, 2*δy, $z_7$]
Point Reference Index
[1,2,1,3]

Figure 14:
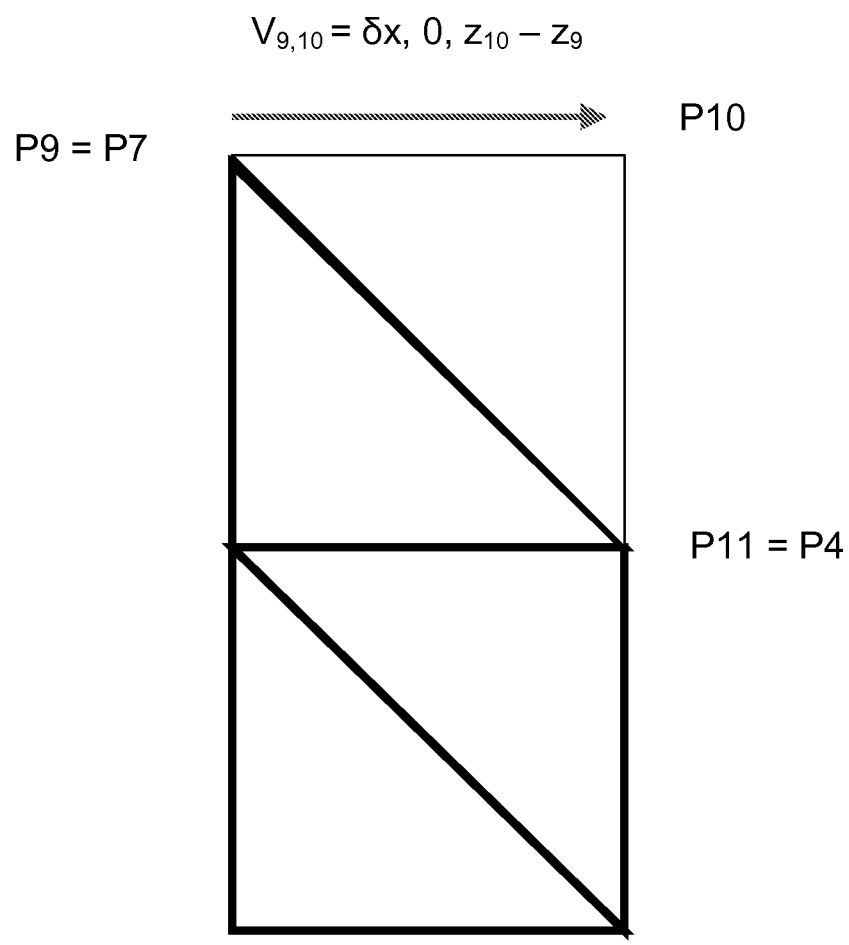
FIG. 14 is a schematic illustration for explaining the encoding of a second triangle in a cell in an elevation mesh adjacent a previously encoded cell.

Similarly after encoding (s4-6) the next set of three adjacent data points P9, P10, P11 as illustrated in FIG. 14 further correspondences would be identified between points P9 and P7 and P8 and P4 and again data defining the set of data points can be generated by updating the point is reference data 50 and point reference index 54 to indicate this correspondence and adding a further vector $V_{9,10}$=δx, 0, $z_{10}-z_9$ connecting points P9 and P10 the points array data so that following the encoding of P9, P10 and P11 the following data would be stored:
Point is Reference Data
[0,0,0,1,0,1,1,0,1,1,0,1]
Points Array
[0,0,$z_0$, 0, δy, $z_1-z_0$, δx, -δy/2, $z_2-(z_1-z_0)/2$, δx, 0, $z_4-z_3$, 0, δy, $z_7-z_6$, δx, 0, $z_{10}-z_9$]
Processed Points Data
[0,0,$z_0$]
[0, δy, $z_1$]
[δx, 0, $z_2$]
[δx, δy, $z_4$]
[0, 2*δy, $z_7$],
[δx, 2*δy, $z_{10}$]
Point Reference Index
[1,2,1,3,4,3]

It will be noted that due to the ordering of the encoding of the data points, the point is reference data 50 includes the repeating pattern [1,0,1]. In addition it will also be noted that due to the regular grid pattern of the elevation mesh, many of the entries in the points array are either equal to 0, δx, or δy or some multiple thereof. Further it will be noted that due to the correspondence between the data points, where data is encoded for adjacent portions of the elevation mesh array, each set of three data points is encoded by adding a single vector to the points array data 52.

When the data points corresponding to the end of a column have been processed, the regular grid encoder 40 selects (s9-8) data for the first cell in the next column of data.

Figure 15:
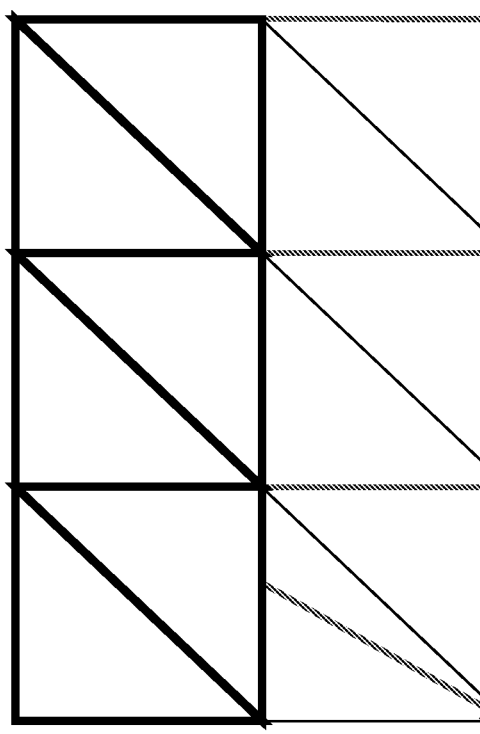
FIG. 15 is a schematic illustration for explaining the encoding of triangles in a column of cells adjacent a column of previously encoded cells.

FIG. 15 is a schematic block diagram of the encoding of data for a second column of cells after data for a previous column has been encoded. Since many of the data points for the second column will have already been encoded when processing the first column, each set of three items of data can be encoded by identifying appropriate references to the previously encoded data and by adding a single vector to identify unencoded data for each group. Thus as indicated data for three cells can be represented by adding data for the following four vectors to the points array 52:
V=δx, -δy/2, $z_{f0}$
V=δx, 0, $z_{f1}$
V=δx, 0, $z_{f2}$
V=δx, 0, $z_{f3}$
where $z_{f0}$, $z_{f1}$, $z_{f2}$ and $z_{f3}$ are values dependent upon the height values in the elevation mesh array being encoded. As will be noted again many of the values required to be added to the points array 52 are either 0, or δx and such values appear in a regular pattern in the data required to be added to the points array 52.

Similarly, it will be appreciated that when processing data for a column adjacent a previously encoded column of data each cell of data will result in the following point is reference data 50 being stored: [1,1,0,1,0,1] in the case of the first cell in the column and [1,1,1,1,0,1] in respect of each subsequent cell in the column.

Returning to FIG. 9, when processing the data for the elevation mesh, the regular grid encoder 40 proceeds to encode data for each portion of the mesh until the final cell in the mesh is encoded. Having generated encoded data for the entire mesh, the regular grid encoder 40 then (s9-9) proceeds to generate edge status data 56 for the mesh. The edge status data 36 comprises data identifying the connectivity of the triangles forming the mesh 26. In conventional PRC-HCT encoding this identifies which triangles have common edges and hence an ordering for processing a mesh. In contrast, in this embodiment which generates PRC-HCT compatible data such an ordering is not required as each triangle of three data points is independently encoded in an order which is independent of the connectivity of the surface defined by the mesh. Thus in this embodiment, the generation of edge status data 56 comprises generating edge status data 56 comprising a series of zeros, one for each of the triangles defined by the elevation mesh indicating that each of the triangles is encoded independently of any of its neighbors.

Finally the encoder converts the point reference index 54 from data identifying absolute values in the array to relative values. That is to say given the following point reference index 34: [1,2,1,3,4, etc] the second value is reduced by the amount corresponding to the first value and the third value is reduced by the amount corresponding to the second etc. Thus processing the data [1,2,1,3,4, etc] becomes [1,1,-1,2,1,-1, etc]. The conversion of the absolute values into relative values in this way both generates data which is compatible with the PRC-HCT standard and also further generates repeating patterns. This is because the generated values are dependent upon the coding order and in the case of a regular array processed in a raster order the relative values repeat in units dependent upon the size of the array.

Thus for example when processing a complete regular 6×6 elevation mesh with a column by column triangle encoding the following point reference data would be generated:
[1, 2, 1, 3, 4, 3, 4, 5, 6, 4, 6, 7, 8, 7, 8, 9, 10, 9, 2, 3, 3, 12, 3, 5, 13, 5, 13, 5, 7, 14, 7, 14, 7, 9, 15, 9, 11, 16, 11, 16, 12, 13, 13, 18, 13, 14, 19, 14, 19, 14, 15, 20, 15, 20, 15, 16, 21, 16, 21, 16, 17, 22, 17, 22, 18, 19, 19, 24, 19, 20, 25, 20, 25, 20, 21, 26, 21, 26, 21, 22, 27, 22, 27, 22, 23, 28, 23, 28, 24, 25, 25, 30, 25, 26, 31, 26, 27, 32, 27, 32, 27, 32, 27, 28, 33, 28, 33, 28, 29, 34, 29, 34]
When converted into relative value data the following is generated:
[1, 1, -1, 2, 1, -1, 1, 1, 1, -1, 1, 1, 1, -1, 1, 1, 1, -1, -7, 1, 0, 9, -9, 2, 8, -8, 8, -8, 2, 7, -7, 7, -7, 2, 6, -6, 6, -6, 2, 5, -5, 5, -4, 1, 0, 5, -5, 1, 5, -5, 5, -5, 1, 5, -5, 5, -5, 1, 5, -5, 5, -5, 1, 5, -5, 5, -4, 1, 0, 5, -5, 1, 5, -5, 5, -5, 1, 5, -5, 5, -5, 1, 5, −5, 5, −5, 1, 5, −5, 5, −4, 1, 0, 5, −5, 1, 5, −5, 5, −5, 1, 5, −5, 5, −5, 1, 5, −5, 5, −5, 1, 5, −5, 5]

As will be apparent, having converted the data in the case of the later columns, the pattern [5, −5, 1, 5, −5] is repeated as a result of the ordered selection of data from the array. It will be appreciated that the actual values of the point reference data will depend upon the size of the array being processed and whether or not an encoded elevation mesh array is completely filled with data values or whether the mesh contains any holes.

The applicants have determined that encoding regular elevation meshes in the manner described results in encoding data which is generally larger than that generated by conventional encoding methods. However, because of the presence of repeating data patterns in the generated encoding the encoded data is more susceptible to compression than a mesh encoded in the conventional manner.

Thus for example in the case of a test of a full 1400×1400 regular elevation mesh, the following results were achieved:

|  | Conventional algorithm | Described encoding |
|---|---|---|
| Data file after compression | 5364.4 KB | 3291.5 KB |
| Data file before compression | 19809.3 KB | 35227.0 KB |

As will be apparent although the described embodiment generates more encoding data after compression using a conventional zLib DEFLATE compression, the file size was approximately 1.6 times smaller.

The reason for the difference is apparent when then uncompressed size of the various elements is considered. In the case of the test example the size of the various elements of the encoding data before compression was determined to be as follows:

| Data files before compression | Conventional algorithm | Described embodiment |
|---|---|---|
| Points array | 9053.6 KB | 8719.5 KB |
| Point is reference data | 477.8 KB | 1433.5 KB |
| Point reference index | 1199.0 KB | 15995.1 KB |
| Edge status data | 3822.7 KB | 3822.7 KB |

It will be apparent that from the above the encoding data generated by the current embodiment is larger than encoding data generated using conventional approaches and that the increase in size primarily due to an increase in the amount of point is reference index 54 and to a lesser extent due to an increase in the point is reference data 50. However for the reasons explained above the generated data is such to include repeated patterns of data making the data particularly susceptible to compression. Thus in the case of the example above, following compression using the zLib DEFLATE algorithm the size of the various elements of the encoding data was reduced as follows:

| Data files after compression | Conventional algorithm | Described embodiment |
|---|---|---|
| Points array | 5255.2 KB | 3177.9 KB |
| Point is reference data | 4.6 KB | 5.1 KB |
| Point reference index | 23.0 KB | 57.9 KB |
| Edge status data | 10.7 KB | 4.1 KB |

Hence it is apparent that although the generated encoding data is larger than encoding data generated using a conventional approach the patterns in the resultant data means that when compressed the points array data 52 is smaller than the corresponding points array data 52 generated using a conventional approach. This reduction in size arises due to the presence of many data entries corresponding to the values 0, δx, or δy or some multiple thereof in the original points array data 52. Similarly the patterns present in the point is reference data 50 enable the larger data set generated using the described approach to be compressed to a similar size to the data generated in a conventional manner.

The greatest reduction in size following compression arises in the case of the point is reference index 54 which is compressed by a factor of 276. This is because of the repeating patterns which appear in the data due to the processing of data points in the elevation mesh in a raster order. Although the resultant data is still larger than the equivalent data in a conventional encoding after compression, the increase in size in the point reference index 54 is more than compensated by the smaller size of the points array 52.

Finally the edge status data 36 which in the case of the described system comprises a list of zeros is compressed to a greater extent than conventional data. However the contribution of this reduction is size is relatively limited as the reduction in data size is relatively small.

Having processed the high level 26 and low level 28 elevation meshes in the manner described, the PRC encoder 41 is invoked to encode the transition mesh 30. This data is generated in a conventional manner such as is disclosed in "Highly Compressed Tessellation (PRC-HCT)" in ISO24517-1:2008 PDF/E SC2N570-PRC-WD.pdf (21 Jul. 2009 Edition). When generating an encoded representation of the transition mesh 30, as processed points data 42 will already be stored for the vertices of the transition mesh 30 which correspond to vertices in the high 26 and low level 28 this can be achieved noting every vertex in the transition mesh 30 as corresponding to a previously encoded vertex.

When point is reference data 50, points array 52, the point reference index 54 and the edge status data 56 for the transition mesh 30 has been generated, the entire contents of the encoded data store 44 is passed to the data compression module 11 for compression before being passed to the data transmission module 13 for transmission via the network.

Compared with conventional TIN generation and compression techniques, the described system enables smaller files to be generated without increasing the deviation of a generated surface from an original elevation mesh.

Thus for example in a test case processing a 500,000 triangle mesh the following results were achieved:

| Approach | Number of triangles after re-gridding | Total error | Max error | File size after compression |
|---|---|---|---|---|
| Conventional VTK Greedy Terrain Decimation | 13,000 | 2060.51 | 2.07 | 59.1 KB |
| Described system | 20,402 | 2070.27 | 0.18 | 28 KB |
| Conventional VTK Greedy Terrain Decimation | 25,000 | 1131.59 | 2.07 | 107.2 KB |
| Described system | 38,060 | 1110.83 | 0.18 | 44.1 KB |
| Conventional VTK Greedy Terrain Decimation | 37,000 | 758.32 | 2.07 | 150.6 KB |

-continued

| Approach | Number of triangles after re-gridding | Total error | Max error | File size after compression |
| --- | --- | --- | --- | --- |
| Described system | 49,913 | 764.62 | 0.18 | 53.3 KB |
| Encoding of mesh using system without pre-processing to reduce triangle count | 500,000 | 0 | 0 | 257.5 KB |

As can be seen from the table above, compared with a conventional approach the described system enables smaller compressed representation of an elevation mesh surface to be created for a similar given level of error.

Both the processing by the re-gridding module 2 and the regular grid encoder 40 result in this increased compression. By way of illustration, the final entry in the above table demonstrates the result of encoding a mesh using the described system without utilizing the re-gridding module 2. Such an approach results in a compression rate of 4.2 bits per triangle. In such an example as no modification of the original mesh data 24 occurs, data for all of the original 500,000 triangles is stored and no errors are introduced.

The processing undertaken by the re-gridding module 3 complements the processing of the regular grid encoder 40 by enabling the numbers of triangles required to be represented to be reduced whilst still retaining a regular grid pattern for most of a polygon mesh surface. Although for a given level of error a conventional TIN greedy terrain decimation results in a greater reduction in the number of triangles to be represented, such processing also removes any coherence to the location of vertices on a surface. This then means that encoding by a regular grid encoder 40 such as is described cannot be undertaken and as a result ultimately much lower compression rates are achieved. Thus for example for the comparative examples shown above although conventional TIN greedy terrain decimation results in representation having 1.6×, 1.5× and 1.35× fewer triangles following processing and compression reduction factors of 2.1×, 2.4× and 2.8× respectively are achieved compared with the conventional approach.

Although embodiments of the present invention have been described where an elevation mesh array is divided into sections represented by high level and low level grids, it will be appreciated that more than two different resolutions of elevation meshes could be utilized. Thus for example in some embodiments three or more different resolutions of elevation grid might be utilized. In such embodiments, initially a determination of the errors associated with representing a portion of an elevation mesh using the lowest resolution grid could be determined. If such areas give rise to an unacceptable level of error that portion of a grid could be replaced by a mid-level resolution grid. Errors for cells in the mid-level grid could then be determined and if those cells were associated with errors greater than a threshold, those cells could then be replaced with cells from a higher level representation of that portion of the grid. This could be determined recursively with portions of a grid ultimately being replaced at the highest levels with copies of data from an original elevation mesh. Where data from an original elevation mesh is copied into the representation, there will inevitably be no difference between the original data and the copied section and hence no errors in the representation will arise.

Although in the above embodiment, an error calculation for a cell in a low level representation of a grid is described as being based on the sum of distance values for points in an original elevation mesh and corresponding points on a representation of a surface, it will be appreciated that many different error values could be determined. Thus for example rather than a sum of distance values, errors values such as the mean distance, the maximum distance, or a root mean square of distance values could be determined. As an alternative, rather than considering distances, other factors such as curvature could be utilized. In some embodiments multiple error values could be calculated to determine whether a lower resolution representation of a portion of a surface is acceptable. In other embodiments a weighted sum of a number of error values could be utilized.

Although in the above embodiment a system has been described which reduces the volume of data for representing an elevation mesh in a two step process, it will be appreciated that in some embodiments the processing of an elevation mesh 24 by a re-gridding module 2 could be omitted and an encoded representation of the original mesh data could be generated directly from the elevation mesh data 24. In such a system no prc encoder 41 would be required as no transition mesh data 30 would be generated. As noted above the processing of elevation mesh data in the form of height data in a regular array by the regular grid encoder 40 is such to generate encoded data which contains many duplicate sections of code which render the code to be highly compressible. This is achieved regardless of whether an elevation mesh is pre-processed to be divided into sections represented by different resolutions of elevation mesh arrays. Rather as is apparent in for example FIG. 6 pre-processing an elevation to divide the array into sections to be represented by different resolutions acts to reduce the numbers of triangles to be encoded to achieve additional compression.

Although in the above embodiment a system has been described where original grid data is sub-sampled by taking every fourth entry in every fourth line to generate a lower resolution grid it will be appreciated that any suitable level of sub-sampling could be utilized. Thus for example in FIG. 6 a sub-sampling of every $5^{th}$ entry every 5 lines is illustrated. It will be appreciated that the lower the sampling rate the greater the reduction of the numbers of triangles but also the greater the potential for error. Thus for example where a grid is sub-sampled at the rate of every $4^{th}$ entry every 4 lines in a high resolution mesh, 2 triangles in a low resolution mesh are used to represent 32 triangles in the original high level mesh. Similarly where a grid is sampled at the rate of every $5^{th}$ entry every 5 lines, 2 low resolution triangles represent the area of 50 high resolution triangles. When reducing the numbers of triangles this way sampling every N entries every N lines results in a $N^2$ reduction in the numbers of triangles. This reduction is slightly offset by having to generate additional triangles for the transition mesh at the boundaries between higher and lower resolution meshes. However, where sampling occurs at the rate of every N entries every N lines at most the numbers of additional triangles in the transition mesh are of the order of 4N.

The above embodiment describes a system where a transition mesh is generated to replace a portion of a higher resolution elevation mesh to define a smooth surface connecting high and low resolution elevation meshes. In other embodiments an alternative approach may be undertaken.

Figure 16:
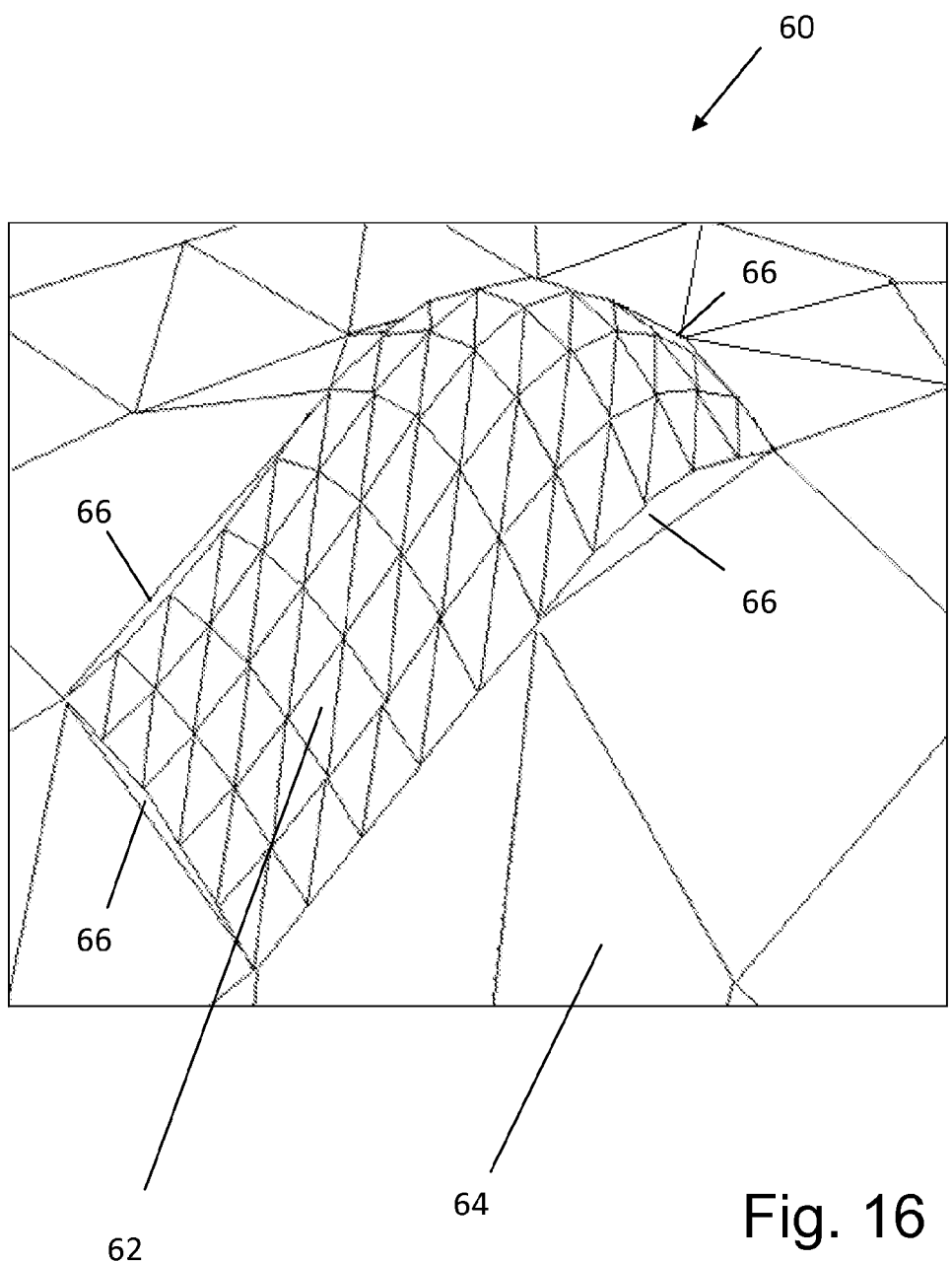
FIG. 16 is a schematic perspective view of an elevation mesh with low and high resolution portions in accordance with an alternative embodiment of the present invention.

FIG. 16 is a schematic perspective view of an elevation mesh surface 60. The surface includes a high resolution portion 62 and a low resolution portion 64. Such a surface may be generated from a high resolution mesh by replacing those areas of a mesh which do not have significant variation in curvature with corresponding portions of a low resolution mesh such as was previously described with reference to FIG. 4. It will be noted that due to the change in resolution of the elevation meshes the high and low resolution meshes do not meet. In some embodiments rather than processing the elevation meshes in the manner described in the previous embodiment, a mesh division module 20 could be arranged to generate transition mesh data 30 just to define surfaces for the gaps 66 in the mesh generated without identifying and processing the boundaries of a high resolution mesh as has previously described. This could be achieved by determining a Delaunay triangulation of the gaps 64 at the boundary between the high 62 and low resolution mesh surfaces. It will however, be appreciated that the above described approach would not generate a smooth surface as discontinuities in the surface would appear at the boundaries between different resolution meshes.

Although in the above embodiments data points in a regular elevation mesh have been described as being processed and encoded in sets of three corresponding to cells where the cells are processed in a raster order, cell by cell, column by column, it will be appreciated that alternative orderings could be used.

Thus for example rather than a raster order all the cells in one column could be encoded by progressing up one column followed by encoding the cells going in the opposite direction in the next column.

Although such alternative encoding patterns are possible, it is preferable to use a raster pattern for most elevation mesh arrays as such an approach maximizes the amount of repetition in the generated data and hence results in smaller data files after compression. When compressing rectangular elevation meshes it has been determined that arranging the data so that the columns which are encoded correspond to the longer sides of the rectangular mesh results in a smaller data file than arranging data so that a greater number of shorter columns of data are processed.

It will be appreciated that when referring to processing column by column processing could equally take place row by row (rows being equivalent to horizontal columns) and that reference to processing column by column throughout the specification should be understood to embrace the equivalent of processing row by row.

A further alternative would be to start encoding with a cell in the centre of a mesh and encode the data cell by cell in a spiral fashion. In such an embodiment columns of adjacent cells would be processed interspersed with data corresponding to rows of data where the rows and columns were of increasing length.

Although in the above embodiments reference has been made to the conventional zLib Deflate algorithm, it will be appreciated that the generation of encoding data containing repeating patterns of data renders the encoding described suitable for compression by any system where repeated data is processed to identify duplicate data streams and copies are replaced with codes where the most frequently repeated duplicates are replaced using the shortest codes.

Although in the described systems data has been described as being processed and compressed prior to transmission, it will be appreciated that the described system is equally applicable for compressing data for storage rather than transmission.

In the described embodiments systems are described which encodes data in a manner compatible with the PRC-HCT approach. At present the specification for encoding three dimensional surface representations in portable document format (pdf) requires such a compatibility thus the described system is suitable for encoding pdf documents which include representations of elevation meshes.

Although in the above described embodiments systems have been described in which data is encoded in a particular manner resulting in a file size which is smaller than that generated using other approaches, it will be appreciated that it is possible that because of the exact data within a particular mesh the amount of data compression achieved may be greater or less than that described. More specifically it will be appreciated that it is possible that under certain circumstances it is possible that an alternative encoding approach may result in an even smaller compressed data file than that described. In such circumstance it may be preferable to encode an elevation mesh using a number of different approaches including those described to determine the smallest data file which can be used to represent a particular data set.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier could be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A computer implemented method of pre-processing data representing a triangle elevation mesh to encode the data in a manner suitable for data compression, the method comprising:

using a computer to:

receive elevation mesh data comprising a two-dimensional array of Z values associating points on a regular uniform X-Y grid with a height value or values indicating that no height data is associated with that point on the grid;

select groups of data points at positions (x,y), (x,y+1), (x+1,y) and (x+1, y+1) in the array corresponding to pairs of adjacent triangles in the mesh in an order which traverses the mesh;

check whether data points selected for encoding are associated with height values; and encode data for a triangle if all the data points selected for encoding are associated with height data by:

determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
  a vector identifying the absolute position identified by a data point in the case of a first data point of a group of three data points defining a triangle in a triangle mesh; or
  a vector identifying the relative position identified by a data point relative to the position of previously encoded data identified by other data points in a group of data points in the case of subsequent data points in a group of three data points defining a triangle in a triangle mesh.

2. The method of claim 1 wherein encoding groups of data points corresponding pairs of adjacent triangles comprises encoding data for a first triangle associated with positions (x,y), (x,y+1), (x+1,y) and a second triangle associated with positions (x,y+1), (x+1, y+1) and (x+1,y).

3. The method of claim 2 wherein after data points corresponding to positions (x,y), (x,y+1), (x+1,y) and (x+1, y+1) have been encoded either data points corresponding to positions (x,y+1), (x,y+2), (x+1, y+1), (x+1, y+2) is encoded if data Z values are associated with positions (x,y+1), (x,y+2), (x+1, y+1), (x+1, y+2).

4. The method of claim 3 comprising encoding data corresponding to positions (x+2,0), (x+2, 1), (x+3,0) and (x+3, 1) immediately after the columns of data associated with x co-ordinates x and x+1 have been encoded.

5. The method of claim 1, wherein said order which traverses the mesh comprises a raster pattern.

6. The method of claim 1 wherein said order which traverses the mesh comprises a spiral pattern.

7. The method of claim 1, wherein said order which traverses the mesh comprises traversing successive columns of the mesh.

8. The method of claim 1, wherein said order which traverses the mesh comprises traversing successive rows of the mesh.

9. The method of claim 1 wherein encoding data representing triangles in the mesh comprises: determining for each data point whether data corresponding to the selected data point has previously been encoded and if so encoding data for the point by storing data identifying the selected data point as being a reference to the previous data point.

10. The method of claim 1 wherein the vector identifying the position of identified by a selected data point comprises:
  a vector identifying the absolute position identified by a data point in the case of a first data point of a group of three data points defining a triangle in a triangle mesh;
  a vector identifying a vector connecting the absolute position of a first data point of a to the absolute position of a second data point in the case of a second data point of a group of three data points defining a triangle in a triangle mesh; and
  a vector identifying a vector connecting the absolute position of the midpoint of a vector connecting the absolute position of a first data point to the absolute position of a second data point to the absolute position of a third data point in the case of a third data point of a group of three data points defining a triangle in a triangle mesh.

11. The method of claim 1 comprising further comprising encoding data identifying data points as being references to previous data points by storing a list identifying which data points are references to previously encoded data points and a list indexing references to the previously encoded data points.

12. The method of claim 11 further comprising processing the list indexing references to previously encoded data points by reducing the second and each successive entry in the list by the immediately preceding value in the list.

13. A computer implemented method of compressing data representing a triangle elevation mesh, the method comprising:
  using a computer to:
  pre-process elevation mesh data comprising a two-dimensional array of Z values associating points on a regular uniform X-Y grid with a height value or values indicating that no height data is associated with that point on the grid to encode the data by:
  selecting groups of data points at positions (x,y), (x,y+1), (x+1,y) and (x+1, y+1) in the array corresponding to pairs of adjacent triangles in the mesh in an order which traverses the mesh; and
  checking whether data points selected for encoding are associated with height values; and
  encoding data for a triangle if all the data points selected for encoding are associated with height data by:
  determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
  a vector identifying the absolute position identified by a data point in
  the case of a first data point of a group of three data points defining a triangle in a triangle mesh; or
  a vector identifying the relative position identified by a data point relative to the position of previously encoded data identified by other data points in a group of data points in the case of subsequent data points in a group of three data points; and
  processing the encoded data by identifying duplicate data streams in the encoded data and replacing the duplicate data streams with codes where the most frequently duplicated data streams are replaced using the shortest codes.

14. A non-transient computer readable medium storing computer interpretable instructions which when interpreted by a programmable computer cause the computer to become configured as a data processing apparatus to process data representing triangle elevation mesh data comprising a two-dimensional array of Z values associating points on a regular uniform X-Y grid with a height value or values indicating that no height data is associated with that point on the grid to encode the data in a manner suitable for data compression, the method comprising:
  selecting groups of data points at positions (x,y), (x,y+1), (x+1,y) and (x+1, y+1) in the array corresponding to pairs of adjacent triangles in the mesh in an order which traverses the mesh; and
  checking whether data points selected for encoding are associated with height values; and
  encoding data for a triangle if all the data points selected for encoding are associated with height data by:
  determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
a vector identifying the absolute position identified by a data point in
the case of a first data point of a group of three data points defining a triangle in a triangle mesh; or
a vector identifying the relative position identified by a data point relative to the position of previously encoded data identified by other data points in a group of data points in the case of subsequent data points in a group of three data points defining a triangle in a triangle mesh.

15. A data processing apparatus for encoding data representing a triangle elevation mesh, the apparatus comprising:
receiving means for receiving elevation mesh data comprising a two-dimensional array of Z values associating points on a regular uniform X-Y grid with a height value or values indicating that no height data is associated with that point on the grid;
a mesh data store operable to store said elevation mesh data; and
an encoder operable to generate data representing the content of the elevation mesh stored in the mesh data store by:
selecting groups of data points at positions (x,y), (x,y+1), (x+1,y) and (x+1, y+1) in the array corresponding to pairs of adjacent triangles in the mesh in an order which traverses the mesh; and
checking whether data points selected for encoding are associated with height values; and
encoding data for a triangle if all the data points selected for encoding are associated with height data by:
determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
a vector identifying the absolute position identified by a data point in
the case of a first data point of a group of three data points defining a triangle in a triangle mesh; or
a vector identifying the relative position identified by a data point relative to the position of previously encoded data identified by other data points in a group of data points in the case of subsequent data points in a group of three data points defining a triangle in a triangle mesh.

16. A computer implemented method of pre-processing data representing a triangle elevation mesh to encode the data in a manner suitable for data compression, the method comprising: using a computer to:
receive elevation mesh data comprising a two-dimensional array of Z values associating points on a regular uniform X-Y grid with a height value or values indicating that no height data is associated with that point on the grid;
select groups of data points at positions (x,y), (x,y+1), (x+1,y) and (x+1, y+1) in the array corresponding to pairs of adjacent triangles in the mesh in an order which traverses the mesh;
check whether data points selected for encoding are associated with height values; and
encode data for a triangle if all the data points selected for encoding are associated with height data by:
determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
a vector identifying the absolute position identified by a data point in the case of a first data point of a group of three data points defining a triangle in a triangle mesh; or
a vector identifying the relative position identified by a data point relative to the position of previously encoded data identified by other data points in a group of data points in the case of subsequent data points in a group of three data points defining a triangle in a triangle mesh, and
wherein encoding groups of data points corresponding pairs of adjacent triangles comprises encoding data for a first triangle associated with positions (x,y), (x,y+1), (x+1,y) and a second triangle associated with positions (x,y+1), (x+1, y+1) and (x+1,y).

17. The method of claim 16 wherein after data points corresponding to positions (x,y), (x,y+1), (x+1,y) and (x+1, y+1) have been encoded either data points corresponding to positions (x,y+1), (x,y+2), (x+1, y+1), (x+1, y+2) is encoded if data Z values are associated with positions (x,y+1), (x,y+2), (x+1, y+1), (x+1, y+2).

18. The method of claim 17 comprising encoding data corresponding to positions (x+2,0), (x+2, 1), (x+3,0) and (x+3, 1) immediately after the columns of data associated with x co-ordinates x and x+1 have been encoded.

19. A computer implemented method of pre-processing data representing a triangle elevation mesh to encode the data in a manner suitable for data compression, the method comprising: using a computer to:
receive elevation mesh data comprising a two-dimensional array of Z values associating points on a regular uniform X-Y grid with a height value or values indicating that no height data is associated with that point on the grid;
select groups of data points at positions (x,y), (x,y+1), (x+1,y) and (x+1, y+1) in the array corresponding to pairs of adjacent triangles in the mesh in an order which traverses the mesh;
check whether data points selected for encoding are associated with height values; and
encode data for a triangle if all the data points selected for encoding are associated with height data by:
determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
a vector identifying the absolute position identified by a data point in the case of a first data point of a group of three data points defining a triangle in a triangle mesh; or
a vector identifying the relative position identified by a data point relative to the position of previously encoded data identified by other data points in a group of data points in the case of subsequent data points in a group of three data points defining a triangle in a triangle mesh, and wherein said order which traverses the mesh comprises a pattern selected from the group comprising a raster pattern, a spiral pattern, traversing successive columns of the mesh, and traversing successive rows of the mesh.

20. A computer implemented method of pre-processing data representing a triangle elevation mesh to encode the data in a manner suitable for data compression, the method comprising: using a computer to:
receive elevation mesh data comprising a two-dimensional array of Z values associating points on a regular uniform X-Y grid with a height value or values indicating that no height data is associated with that point on the grid;
select groups of data points at positions (x,y), (x,y+1), (x+1,y) and (x+1, y+1) in the array corresponding to pairs of adjacent triangles in the mesh in an order which traverses the mesh;
check whether data points selected for encoding are associated with height values; and
encode data for a triangle if all the data points selected for encoding are associated with height data by:
determine for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
a vector identifying the absolute position identified by a data point in the case of a first data point of a group of three data points defining a triangle in a triangle mesh; or
a vector identifying the relative position identified by a data point relative to the position of previously encoded data identified by other data points in a group of data points in the case of subsequent data points in a group of three data points defining a triangle in a triangle mesh, and
wherein encoding data representing triangles in the mesh comprises determining for each data point whether data corresponding to the selected data point has previously been encoded and if so encoding data for the point by storing data identifying the selected data point as being a reference to the previous data point.

21. A computer implemented method of pre-processing data representing a triangle elevation mesh to encode the data in a manner suitable for data compression, the method comprising: using a computer to:
receive elevation mesh data comprising a two-dimensional array of Z values associating points on a regular uniform X-Y grid with a height value or values indicating that no height data is associated with that point on the grid;
select groups of data points at positions (x,y), (x,y+1), (x+1,y) and (x+1, y+1) in the array corresponding to pairs of adjacent triangles in the mesh in an order which traverses the mesh;
check whether data points selected for encoding are associated with height values; and
encode data for a triangle if all the data points selected for encoding are associated with height data by:
determine for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
a vector identifying the absolute position identified by a data point in the case of a first data point of a group of three data points defining a triangle in a triangle mesh; or
a vector identifying the relative position identified by a data point relative to the position of previously encoded data identified by other data points in a group of data points in the case of subsequent data points in a group of three data points defining a triangle in a triangle mesh,
and further comprising
encoding data identifying data points as being references to previous data points by storing a list identifying which data points are references to previously encoded data points and a list indexing references to the previously encoded data points,
processing the list indexing references to previously encoded data points by reducing the second and each successive entry in the list by the immediately preceding value in the list.

22. A computer implemented method of pre-processing data representing a triangle mesh having a plurality of vertices wherein the vertices correspond to points on regular uniform X-Y grid with a variable Z value at each grid point to encode the data in a manner suitable for data compression, the method comprising: using a computer to:
receive elevation mesh data comprising a two-dimensional array of Z values associating points on a regular uniform X-Y grid with a height value;
select groups of data points at positions (x,y), (x,y+1), (x+1,y) and (x+1, y+1) corresponding to pairs of adjacent triangles in the mesh in an order which traverses the mesh; and
encode the selected groups of data by:
determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
a vector identifying the absolute position identified by a data point in the case of a first data point of a group of three data points defining a triangle in a triangle mesh; or
a vector identifying the relative position identified by a data point relative to the position of previously encoded data identified by other data points in a group of data points in the case of subsequent data points in a group of three data points defining a triangle in a triangle mesh.

23. The method of claim 22 wherein encoding groups of data points corresponding pairs of adjacent triangles comprises encoding data for a first triangle associated with positions (x,y), (x,y+1), (x+1,y) and a second triangle associated with positions (x,y+1), (x+1, y+1) and (x+1,y).

24. The method of claim 23 wherein after data points corresponding to positions (x,y), (x,y+1), (x+1,y) and (x+1, y+1) have been encoded either data points corresponding to positions (x,y+1), (x,y+2), (x+1, y+1), (x+1, y+1) is encoded if data Z values are associated with positions (x,y+1), (x,y+2), (x+1, y+1), (x+1, y+1).

25. The method of claim 24 comprising encoding data corresponding to positions (x+2,0), (x+2, 1), (x+3,0) and (x+3, 1) immediately after the columns of data associated with x co-ordinates x and x+1 have been encoded.

26. The method of claim 22, wherein said order which traverses the mesh comprises a raster pattern.

27. The method of claim 22 wherein said order which traverses the mesh comprises a spiral pattern.

28. The method of claim 22, wherein said order which traverses the mesh comprises traversing successive columns of the mesh.

29. The method of claim 22, wherein said order which traverses the mesh comprises traversing successive rows of the mesh.

30. The method of claim 22, wherein encoding data representing triangles in the mesh comprises: checking whether data points selected for encoding are associated with valid z value data and only encoding data for a triangle if all the data points selected for encoding a triangle are associated with valid z value data.

31. The method of claim 22 wherein encoding data representing triangles in the mesh comprises: determining for each data point whether data corresponding to the selected data point has previously been encoded and if so encoding data for the point by storing data identifying the selected data point as being a reference to the previous data point.

32. The method of claim 22 wherein the vector identifying the position of identified by a selected data point comprises:
   a vector identifying the absolute position identified by a data point in the case of a first data point of a group of three data points defining a triangle in a triangle mesh;
   a vector identifying a vector connecting the absolute position of a first data point of a to the absolute position of a second data point in the case of a second data point of a group of three data points defining a triangle in a triangle mesh; and
   a vector identifying a vector connecting the absolute position of the midpoint of a vector connecting the absolute position of a first data point to the absolute position of a second data point to the absolute position of a third data point in the case of a third data point of a group of three data points defining a triangle in a triangle mesh.

33. The method of claim 22 comprising further comprising encoding data identifying data points as being references to previous data points by storing a list identifying which data points are references to previously encoded data points and a list indexing references to the previously encoded data points.

34. The method of claim 33 further comprising processing the list indexing references to previously encoded data points by reducing the second and each successive entry in the list by the immediately preceding value in the list.

35. A computer implemented method of pre-processing data representing a triangle elevation mesh having a plurality of vertices wherein the vertices correspond to points on regular uniform X-Y grid with a variable Z value defining a triangle in a triangle mesh to encode the data in a manner suitable for data compression, the method comprising: using a computer to
   pre-process data representing a triangle mesh having a plurality of vertices wherein the vertices correspond to points on regular uniform X-Y grid with a variable Z value at each grid point to encode the data by:
   select groups of data points at positions (x,y), (x,y+1), (x+1,y) and (x+1, y+1) corresponding to pairs of adjacent triangles in the mesh in an order which traverses the mesh; and
   encoding the selected groups of data by:
   determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
   a vector identifying the absolute position identified by a data point in the case of a first data point of a group of three data points defining a triangle in a triangle mesh; or
   a vector identifying the relative position identified by a data point relative to the position of previously encoded data identified by other data points in a group of data points in the case of subsequent data points in a group of three data points; and
   processing the encoded data by identifying duplicate data streams in the encoded data and replacing the duplicate data streams with codes where the most frequently duplicated data streams are replaced using the shortest codes.

36. A non-transient computer readable medium storing computer interpretable instructions which when interpreted by a programmable computer cause the computer to become configured as a data processing apparatus to process data representing triangle elevation mesh data comprising a two-dimensional array of Z values associating points on a regular uniform X-Y grid with a height value or values indicating that no height data is associated with that point on the grid to encode the data in a manner suitable for data compression, the method comprising:
   selecting groups of data points at positions (x,y), (x,y+1), (x+1,y) and (x+1, y+1) corresponding to pairs of adjacent triangles in the mesh in an order which traverses the mesh; and
   encoding the selected groups of data by:
   determining for each data point whether data corresponding to the selected data point has previously been encoded and if not encoding data for the selected data point by storing data defining a vector identifying the position identified by the x and y co-ordinates for the selected data point and the z value associated with the x and y co-ordinates wherein the vector comprises:
   a vector identifying the absolute position identified by a data point in the case of a first data point of a group of three data points defining a triangle in a triangle mesh; or
   a vector identifying the relative position identified by a data point relative to the position of previously encoded data identified by other data points in a group of data points in the case of subsequent data points in a group of three data points defining a triangle in a triangle mesh.

* * * * *